United States Patent [19]

Burns, III et al.

[11] 4,084,103
[45] Apr. 11, 1978

[54] SYSTEM-STATE AND OPERATING CONDITION SENSITIVE CONTROL METHOD AND APPARATUS FOR ELECTRIC POWER DELIVERY SYSTEMS

[76] Inventors: William Wesley Burns, III, 45-D, Colonial Apts., Durham, N.C. 27707; Thomas George Wilson, 2721 Sevier St., Durham, N.C. 27705

[21] Appl. No.: 804,225

[22] Filed: Jun. 7, 1977

[51] Int. Cl.² ............................................. H01H 47/00
[52] U.S. Cl. ........................ 307/132 R; 307/132 EA; 363/124
[58] Field of Search .................. 307/96, 97, 125, 130, 307/131, 229, 240, 132 R, 132 E, 132 EA; 363/124

[56] References Cited

U.S. PATENT DOCUMENTS

| | | | |
|---|---|---|---|
| 3,454,834 | 7/1969 | Giannamore | 363/124 |
| 3,953,783 | 4/1976 | Peters, Jr. | 363/124 |
| 3,953,785 | 4/1976 | Bell, Jr. | 363/124 |

*Primary Examiner*—Robert K. Schaefer
*Assistant Examiner*—Eugene S. Indyk
*Attorney, Agent, or Firm*—Charles W. Helzer

[57] ABSTRACT

This invention provides a method and apparatus for determining a precise switching sequence for the power switching elements of electric power delivery systems of the on-off switching type and which enables extremely fast transient response, precise regulation and highly stable operation. The control utilizes the values of the power delivery system power handling network components, a desired output characteristic, a system timing parameter, and the externally imposed operating conditions to determine where steady state operations should be in order to yield desired output characteristics for the given system specifications. The actual state of the power delivery system is continuously monitored and compared to a state-space boundary which is derived from the desired equilibrium condition, and from the information obtained from this comparison, the system is moved to the desired equilibrium condition in one cycle of switching control. Since the controller continuously monitors the power delivery system's externally imposed operating conditions, a change in the conditions is immediately sensed and a new equilibrium condition is determined and achieved, again in a single cycle of switching control.

31 Claims, 41 Drawing Figures $$L_N = \frac{I_{ref}}{V_{ref} T_{ref}} L \qquad v_{I-N} = \frac{v_I}{V_{ref}} \qquad v_{O-N} = \frac{v_O}{V_{ref}}$$

$$C_N = \frac{V_{ref}}{I_{ref} T_{ref}} C \qquad i_{X-N} = \frac{i_X}{I_{ref}} \qquad i_{O-N} = \frac{i_O}{I_{ref}}$$

$$r_{C-N} = \frac{I_{ref}}{V_{ref}} r_C \qquad v_{C-N} = \frac{v_C}{V_{ref}} \qquad t_N = \frac{t}{T_{ref}}$$

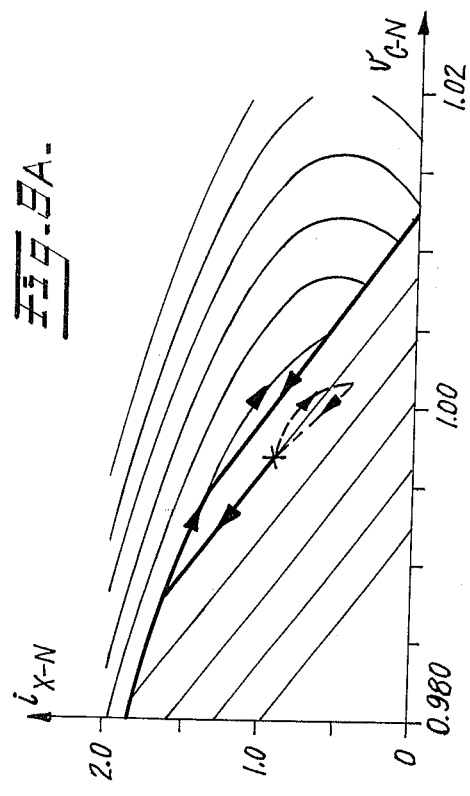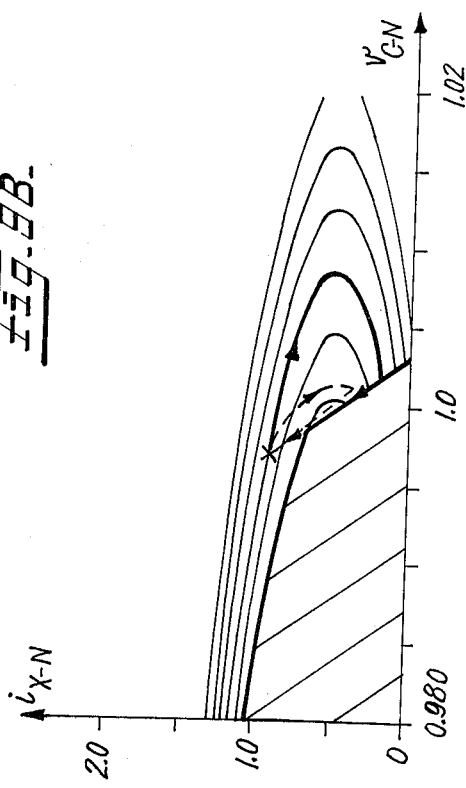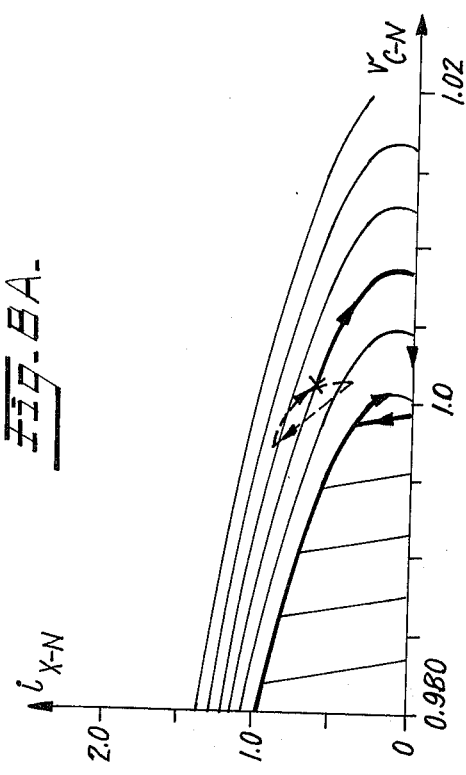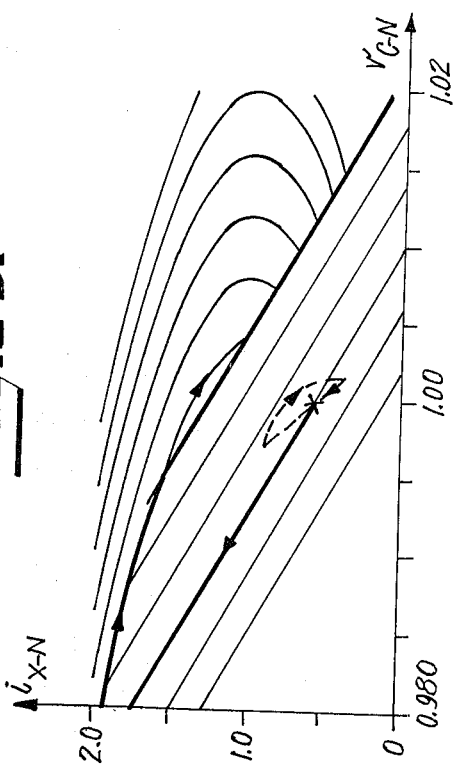

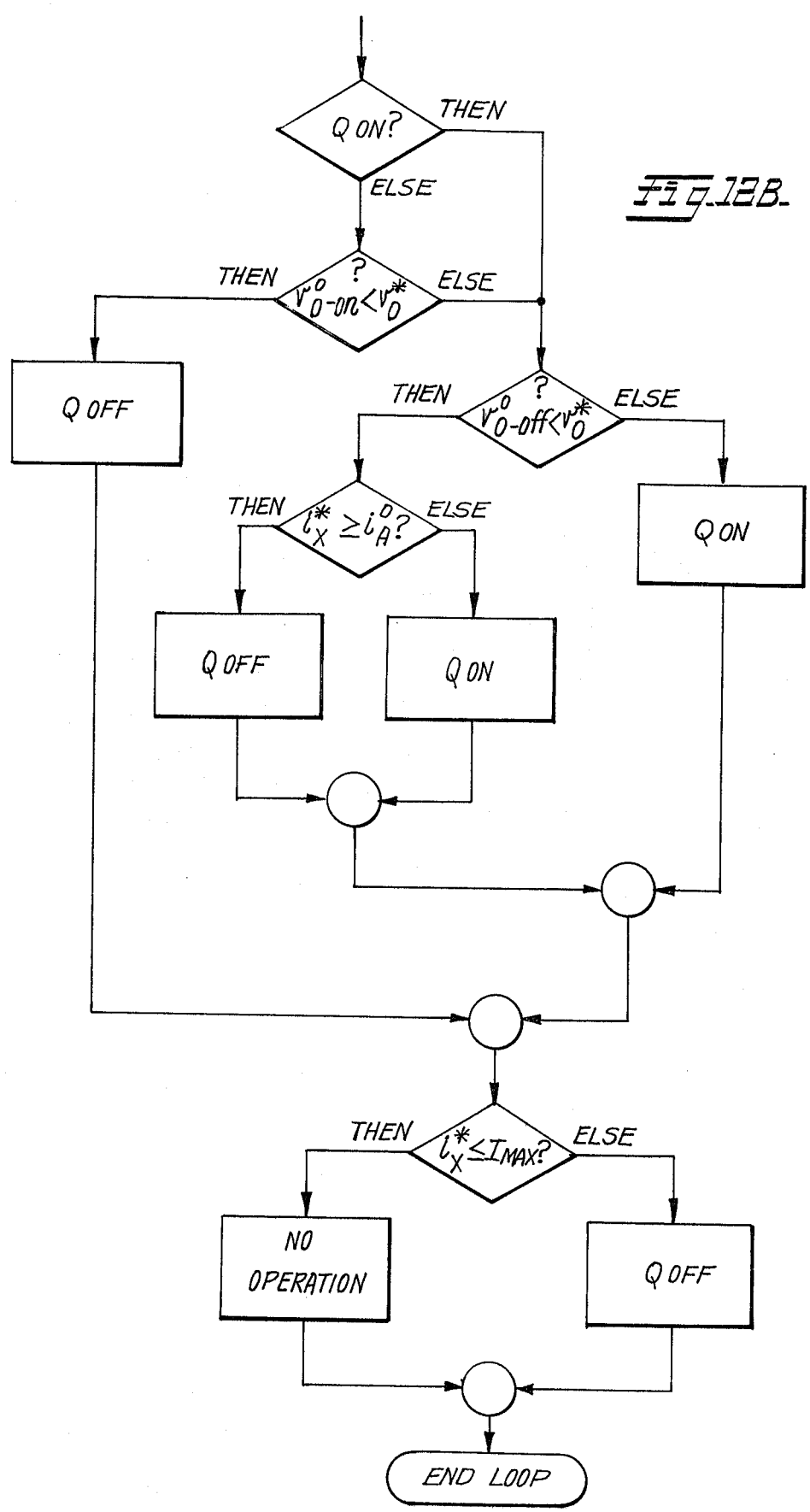

SIMPLIFIED BLOCK DIAGRAM OF ANALOG IMPLEMENTATION $E_O = X \left(\dfrac{Y}{Z}\right)^{\propto}$

SYSTEM-STATE AND OPERATING CONDITION SENSITIVE CONTROL METHOD AND APPARATUS FOR ELECTRIC POWER DELIVERY SYSTEMS

BACKGROUND OF THE INVENTION

Field of Invention

The invention described herein was made in the performance of work under NASA Contract No. NGL 34-001-001 and is subject to the provisions of Section 305 of the National Aeronautics and Space Act of 1958 (72 Stat. 435; 42 U.S.C. 2457).

More particularly, the invention relates to a novel method and controller apparatus for an on-off switching type of power delivery system which utilizes the values of the system-state variables and the externally imposed operating conditions to determine a switching order for the power switching elements of the system, and which enables the system to immediately respond to sudden changes in the input supply voltage or the output power desired and to return the system to desired output operating conditions more quickly than is possible with previously known control techniques and apparatus.

Prior Art Problem

A principal purpose of electric power delivery systems is to extract electrical energy from an unregulated source of electic power and to transfer this energy to an electrical load in some regulated form which is different from that supplied by the source. It has long been recognized in the industry that a preferred way of accomplishing this task is to use switching devices to control the flow of electric energy rather than to use continuously variable dissipative elements which shunt off unwanted energy. The use of switching devices enables a more efficient transfer of energy from the source to the load since no energy is dissipated intentionally within the transferring network and consequently a greater percentage of the electrical energy extracted from the source can be delivered to the load. This feature is particularly important in applications, such as spacecraft power sources, in which the sources of electric energy are usually severely limited. Power transistors and thyristor (silicon controlled rectifiers) comprise the preferred switching devices to be used in the switching on-off type of power delivery systems; however, the power switching elements used in such systems are by no means restricted to such semiconductor devices.

While using power switching elements in a power delivery system, electrical energy must be handled in concentrated bunches rather than in a continuously smooth flow and this characteristic makes the power processing task more difficult and often unstable. Special control sub-systems have been designed specifically for the purpose of determining when to turn the switching elements on and off in the power handling paths of the power delivery systems. Numerous techniques and apparatus for accomplishing this task have been developed in recent years, with most of these prior art techniques sensing the power delivery system output voltage and adjusting the power switching element duty cycles in order to compensate for any tendency in the output voltage to rise or fall from a specified reference value. Other techniques sense more than one signal from within the system, combine them in some usually heuristically determined manner and compare the resultant analog signal to a fixed threshold boundary level to determine a switching sequence. All of these known techniques usually have some inherent switching constraints such as a minimum switch on-time or a minimum switch off-time for some fixed period of time. These constraints usually hinder the performance of the power delivery system as a whole, particularly in the presence of transient disturbances, as will be explained more fully hereinafter.

Power delivery systems usually are designed to operate over some specified range of input (source) conditions and range of output (load) conditions. For any combination of source and load conditions, the power delivery system must operate at a different equilibrium condition in order to maintain the same desired output characteristics such as output load current or desired output load voltage. Thus, when the system is subjected to some external disturbances such as a change in input voltage or a change in the required output power, the power delivery system must move to a new steady-state operating condition which can accommodate these new conditions. This change from one steady-state (equilibrium) condition to another requires a redistribution of energy within the system which must be accomplished through a changed switching sequence as determined by the controller. Most conventional control techniques and apparatus do this in a more or less iterative manner whereby the switching duty-cycle ratios of on to off periods are changed from one switching cycle to another as the system's analog control signals change with respect to the fixed threshold boundary levels. Achievement of the new steady-state condition in this manner can be a slow process and can be accompanied by significantly harsh transient variations in the system output characteristics which in many cases can lead to unstable modes of operation. The switching cycle timing restrictions described above can also contribute to poor transient performance because they may not allow the energy flow required to accommodate a particular disturbance. Thus, it will be appreciated that the function of the power delivery system control is to turn the power switching elements on and off in such a way as to pass electric energy through the system to the output at a specified rate and in such a manner as to attain the specified output operating characteristics in minimum time with minimum disturbance. Furthermore, the controller must change its switching sequences during transient disturbances in order to regain the desired output operating characteristics at a new equilibrium condition as quickly and efficiently as possible. The very nature of the on-off switching type of control renders this a difficult task to achieve.

SUMMARY OF INVENTION

This invention provides a novel method and apparatus for determining a precise switching sequence for the power switching elements of on-off switching type electric power delivery systems which enables such systems to obtain extremely fast transient response to changes in externally imposed operating conditions, precise regulation and highly stable operation. The control utilizes the values of the power delivery system power handling network components and the externally imposed operating conditions to determine where steady-gate operations should be in order to yield the desired output characteristics for the given power delivery system specifications. The actual state of the system is monitored continuously and compared to the desired equilibrium condition, and from the information thus obtained, the system is moved to the desired equilibrium condition in one on-off switching cycle of control. Since the controller continuously monitors the system's externally imposed operating conditions, a change in the conditions is immediately sensed and a new equilibrium condition is determined and achieved, again in one switching cycle of control.

In practicing the invention, a new and improved controllable on-off switching type of power delivery method and system is provided for transferring electrical power from an input source of electrical energy to a load in a controlled manner. The improvement comprises a novel controller for optimizing the on-off period of operation of the on-off switching type power delivery system to thereby provide extremely fast transient response to changed operating conditions imposed on the system, precise regulation and highly stable operation. The controller includes operating condition sensing means for sensing the operating conditions externally imposed on the power delivery system and system state variables sensing means for sensing the actual state of selected power handling network components comprising the power delivery system. Fast responding boundary computation means are provided which are responsive to the operating condition sensing means and are supplied with the component values of the selected power handling network components, a desired output operating characteristic for the system and a designer specified timing parameter. With this information the boundary computation means derives dynamic state-space boundary values defining a desired new area of steady-state operation and distinct new areas of switch-on and switch-off operation in the operating state-space for the power delivery system under different externally imposed operating conditions. Comparison means are provided which are responsive to the boundary computation means and the system-state sensing means for comparing the values of the system-state variables to the dynamic state-space switching boundary value determined by the boundary computation means. As a result of this comparison, respective on-off controlling output switching signals are derived for controlling the on-off states of the power delivery system in response to the location of the state of the system variables in the system-state space relative to the switching boundary values.

The system-state space for the on-off power delivery system can be characterized by families of distinct different switch-on (on-time) and switch-off (off-time) trajectories in the system-state space for a given power delivery system and set of imposed operating conditions with rspect to which there is a unique set of dynamic boundary values identified by the system parameters and desired output characteristics for the system. The novel controller during each switching cycle causes the power delivery system to remain in a selected on-off condition in response to the on-off controlling output signal from the comparison means while the power delivery system-state traverses along a selected on-time/off-time trajectory dependent upon the initial operating state of the system-state variables until intercepting the dynamic state-space boundary values characteristic for the instantaneously imposed operating condition's and to switch over to the opposite on-off condition upon this occurrence. Thereafter, the control causes the power delivery system to remain in the switched-over condition while the system-state traverses along the uniquely selected companion on-time/-off-time trajectory identified by the interception of the first-mentioned trajectory with the dynamic state-space switching boundary value until reaching a desired steady-state operating condition whereby the system can be changed from an initial operating state to a new different operating state in response to newly imposed operating conditions in a precise, single-cycle switching sequence.

The shapes of the system-state space on-off trajectories for the power delivery system are known functions of the selected power handling network component values such as the system inductance and capacitance and of the externally imposed operating conditions such as the input voltage and the output current whereby a change in anyone of these parameters causes the shapes of the on-off trajectories to change dynamically along with the change in the dynamic state-space switching boundary values resulting from the change in any of these parameters.

Power delivery systems incorporating the novel control can be operated either in a continuous reactor mmf mode or a discontinuous reactor mmf mode. The novel controller may be used to control any on-off switching type of power delivery system such as power converters of the DC to DC type achieving either voltage step-up, current step-up or both, DC to AC converters and AC to AC converters as will be explained more fully hereinafter. The controller itself may be embodied in digital, analog, or hybrid forms of circuitry.

BRIEF DESCRIPTION OF DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference character, and wherein:

FIGS. 8A and 8B are state-plane plots showing the transient response of the system of FIG. 7 to step changes in load current from 0.5 to 0.1 and 1.0;

FIGS. 9A and 9B are plots in the state-plane showing the transient response of the system of FIG. 7 to step changes in input voltage from 0.75 to 0.5 and 0.9, respectively;

FIGS. 12A and 12B comprise a flow chart of a program for computing the required state-plane boundary values and effecting the necessary comparisons to derive the controlling on-off output signals for application to the power switching element of the system of FIG. 7;

FIGS. 17A and 17B are state-plane plots of the transient response of the system shown in FIG. 15 to step changes in output load current $i_{O-N}$ from 0.5 to 1.0 and from 0.5 to 0.1, and wherein the dashed closed curves represent the original steady-state trajectory for $v_{I-N} = 1.5$ and $i_{O-N} = 0.5$;

FIG. 19 is a plot in the state-plane illustrating the switching boundary (solid bold line) for the system of FIG. 15 and two examples of transient trajectories for the converter with $v_{I-N} = 1.5$ and $i_{O-N} = 0.5$ where the initial states are indicated by X;

DETAILED DESCRIPTION OF PREFERRED EMBODIMENTS

Figure 1:
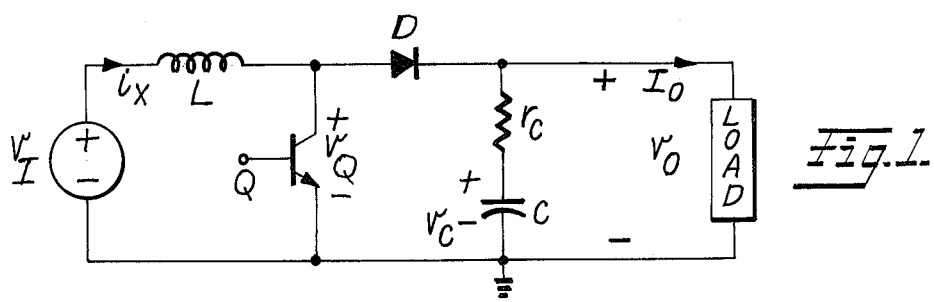
FIG. 1 is a simplified schematic circuit diagram of a voltage step-up DC to DC power converter which is exemplary of one form of on-off switching type power delivery system suitable for use in practicing the present invention.

The principle function of electric power delivery systems of the on-off switching type is to extract electrical energy from a source of electricity at some unregulated voltage level, but at a controlled rate, in order to provide a precisely regulated supply of power to an electrical load at some other specified voltage and/or current level. The only means available in a power delivery system of the on-off switching type for controlling this rate of energy extraction is the turning-on and turning-off of the power switches of the system in a controlled manner. It is the principal task of the controller sub-system to determine this sequence. Thus, the behavior of the power delivery system and its subsequent level of performance are very much dependent on the particular control employed to generate the switching decisions. Because of the highly non-linear nature of on-off switching power delivery systems, classical circuit analysis techniques have been unable to provide adequate guidance for the design and development of these controller sub-systems. Consequently, most control techniques for this type of power delivery system have been drived heuristically, with an inadequate understanding of the cause and effect relationships which exist between the action of the controller and the performance of the power stage of the power delivery system which results from it. Thus, heretofore it has been quite difficult to predict the performance characteristics of on-off switching type power delivery systems over a range of specified operating conditions, and it is even more difficult to determine what elements are required in a control sub-system to alleviate the tendency of these highly non-linear systems toward instability.

This application presents an analytically derived approach to the control of on-off switching type power delivery systems which enables improved system performance and enhances understanding of the manner in which this improved performance is accomplished. The control technique and apparatus described herein is derived from a state-space analysis of on-off switching type power delivery systems (specifically a DC to DC power converter is analyzed in detail) and which enables a graphical visualization of the movement of the system-state during both steady-state and transient operation. This graphical representation of the behavior of on-off control power delivery systems yields considerable qualitative insight into the cause and effect relationships which exist between various commonly used power delivery sysem control functions and the system performance which results from them. The theoretical insight thus provided leads to an easier understanding of the state-trajectory control law employed by the controller made available by this invention and which utilizes all of the information available from the power stage of the on-off control power delivery system to determine the unique system equilibrium condition which yields desired steady-state output characteristics for the system, and the exact on-off switching sequence which is needed to move the state of the power delivery system from an initial condition to the desired new steady-state condition in one on-off switching cycle of control.

On-off controlled power delivery systems operating in conjunction with the control law according to this invention exhibit short response times to external disturbances, precise static regulation and are inherently stable in operation over an entire range of specified operating conditions. This improved performance is achieved by making the control decision to switch on or switch off based on the location of the state of the power delivery system relative to a state-space on-off switching boundary which is a function of the power delivery system power handling network component values, the desired steady-state operating characteristics, and the externally imposed operating conditions. To enhance understanding of the new and improved control, a further understanding of the nature of the state-space switching boundary is required.

The theory of control presented in this application is derived with respect to a qualitative state-space analysis of two different widely used classes of on-off controlled switching power delivery systems. For convenience, the first of these systems involving a voltage step-up DC to DC power converter is discussed in general, a normalized model of the converter power stage is used to illustrate the concepts and theory of the control together with a general discussion of the power converter behavior as it can be portrayed in a system-state plane. Particular attention is given to observing how the power converter system behavior changes when subjected to changes in internal parameters or externally imposed operating conditions. The concepts developed with respect to the specific voltage step-up DC to DC power converter then are extended to a current step-up DC to DC power converter both of which are representative of a general class of on-off control switching power delivery systems. Numerous other on-off controlled switching power delivery systems exist which can be used in conjunction with the novel controller of this invention, but the fundamental operation characteristics of each of them can be readily derived in a manner parallel to that illustrated herein for one or the other of the basic configurations specifically described in this application. Consequently, an understanding of the operation of the controller with respect to these power system configurations leads directly to an understanding of the application of the controller to others.

FIG. 1 is a simplified schematic circuit diagram of the power handling stage of a voltage step-up DC to DC power converter system. It should be understood that in addition to the power handling stage shown in FIG. 1 there is a controller sub-system which will be described more fully hereinafter with respect to FIG. 7 in particular insofar as the circuit of FIG. 1 is concerned. For each of the basic power handling circuit configurations, such as shown in FIG. 1, the overall system performance with respect to such characteristics as output voltage overshoot or system response times to transient disturbances, etc., is to a large extent, dependent upon the manner in which the control function is accomplished. The state-space analysis approach described in this application enables a clear visualization of this cause and effect relationship between the system control function and the resultant power handling network behavior.

The primary function of the power handling network shown in FIG. 1 is to extract electrical energy from a given DC source at some unregulated voltage level, but at a controlled on-off switching rate, in order to deliver precisely regulated DC power to an electrical load at some other specified voltage level. This power converter circuit is capable of delivering power to a load at a regulated voltage level which is greater than that of the voltage level of the source. Thus, this configuration is commonly known as the "voltage step-up" or "voltage boost" converter. Other power converter circuits are capable of delivering power to a load at a regulated voltage level which is less than that of the voltage level of the source but with a current level which is greater than that drawn from the source. The power converter configuration shown in FIG. 15, for example, is capable of supplying power to a load at a higher current level than that which is drawn from the source, and consequently is known as a "current step-up" or "voltage buck" converter. Still other converter power stage configurations are capable of stepping up either the output voltage or the output current. The relative magnitudes of the input supply voltage available and the regulated output voltage desired is the criterion that determines which type of power converter circuit configuration should be used for a given application. Thus, it will be appreciated that each power circuit configuration is designed for use with a specific application in mind. For the sake of simplicity and conciseness in the presentation of the following discussion, detailed descriptions of the concepts and theories derived are presented as they are developed for the voltage step-up DC to DC power circuit configuration only. Equivalent characteristic data and examples are given for one other representative power circuit configuration of the DC to DC power converter family, namely the current step-up converter, to highlight some of the differences and unusual characteristic features that are peculiar to this configuration. It is believed that these two examples should serve adequately to illustrate to those skilled in the art the practice of this invention with other members of the family of well known inductor energy storage power converters such as the single winding current-or-voltage step-up converter, complementary converter systems, and related offspring with multiple outputs and tapped windings. The voltage step-up power converter configuration has been chosen for the more complete presentation because it has been found to exhibit more severe stability problems and greater analytical difficulty than other configurations, and hence is believed to be more fully illustrative of the concepts of this invention.

The rate at which the DC to DC converter shown in FIG. 1 extracts elecrical energy from a source is controlled by successively opening and closing a power switch so as to periodically interrupt the flow of electrical energy from the source to the load. These switches, denoted as Q in FIG. 1 are often silicon power transistors or silicon controlled rectifiers in actual application, but the type of switch employed is of no consequence in the applicability of the controller of the present invention. For this reason, the more general symbol for a switch is used in the circuit diagrams discussed hereinafter rather than the particular symbol for a transistor. During the time that the power switch Q is closed, energy is extracted from the source and stored in a magnetic field in the linear inductor L. During the same on-time period, energy which had previously been stored in an electric field between the plates of the output capacitor C is released to the load. During the time that the switch Q is open, energy stored in the inductor L during the previous half-cycle is released to the load and to the capacitor C to replenish the energy which was lost during the switch closure time. The lengths of time that the switch is open, $T_{off}$ and closed, $T_{on}$, in both steady-state and transient operations determines how much and how quickly energy is transferred to the load. Consequently, these are very important parameters which must be precisely regulated by the controller to provide optimum performance for any given power delivery system designed with a particular application in mind.

Figure 1A:
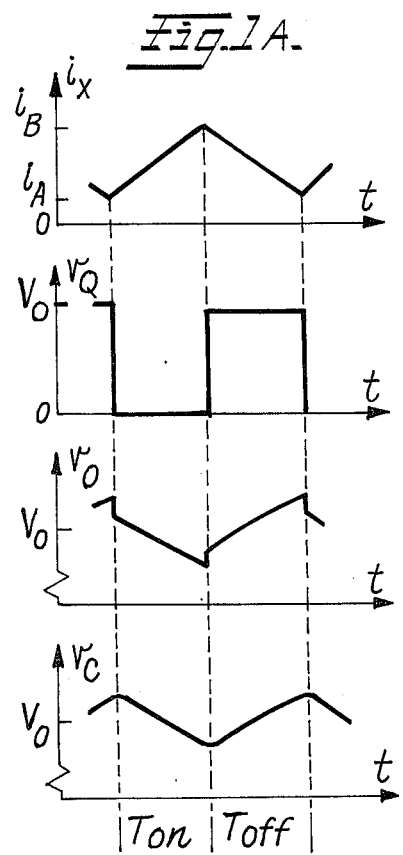
FIG. 1A is a series of current and voltage versus time characteristic curves illustrating operation of the circuit of FIG. 1 in a continuous conduction mode.
Figure 1B:
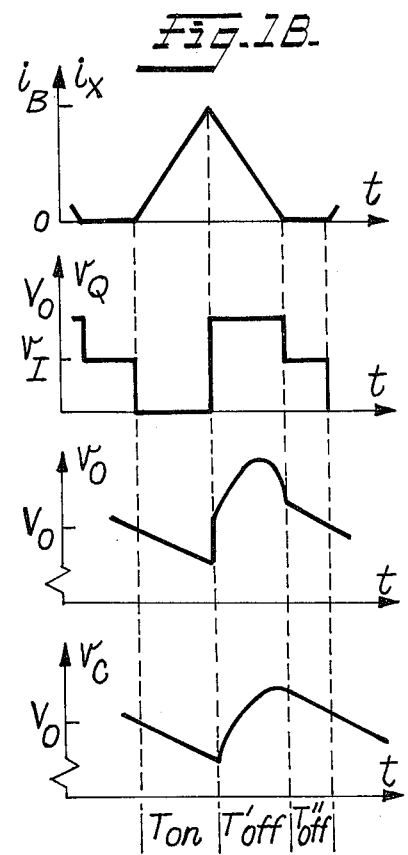
FIG. 1B is a series of current and voltage versus time characteristic curves illustrating operation of the circuit of FIG. 1 in the discontinuous conduction mode.

Characteristic waveforms for the voltage step-up DC to DC power converter of FIG. 1 are shown in FIGS. 1A and 1B respectively. The characteristic waveforms of FIG. 1A illustrate operation of the circuit in the continuous inductor current conduction mode of operation, and the waveforms of FIG. 1B illustrate the discontinuous inductor current conduction mode, since the circuit configuration is capable of operating in either mode of operation depending upon externally imposed operating conditions. The distinction between the two modes of operation is based on the behavior of the current $i_X$ in the energy storage reactor. If this current falls to zero during the time that the power switch is open, the converter is said to be operating in the discontinuous conduction mode. Otherwise, the converter is said to be in the continuous conduction mode. Another useful distinctiion which is illustrated in the waveforms shown in FIGS. 1A and 1B is the difference between the voltage $v_C$ across the output of ideal capacitors and the actual output voltage $v_O$ which is present across non-ideal capacitors. This difference is due to the presence of the parasitic equivalent series resistance (ESR) shown as $r_C$ in FIG. 1, which is always present to some degree in actual physical capacitors. This parasitic effect has been included even in the simplified diagram of FIG. 1, because it has been found to play an important and sometimes dominant role in establishing converter system behavior.

Figure 2:
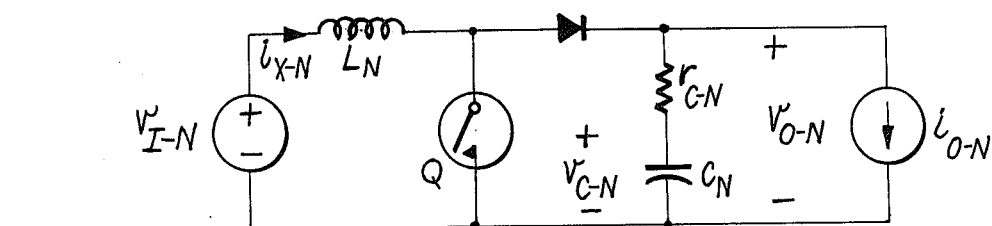
FIG. 2 is a normalized representation of the power converter circuit shown in FIG. 1 with the normalization factors $V_{ref} = V_O$(rated), $I_{ref} = I_O$(rated) and $T_{ref} = \sqrt{LC}$ with the normalized circuit parameters and variables in terms of the original network values being set forth in the equations listed under FIG. 2.

For purposes of generality and to facilitate relative comparison of power delivery system performance characteristics, the basic power delivery system power stages described in this application have been normalized as shown in FIG. 2 for the power circuit of FIG. 1. Normalization factors have been chosen so that the normalized rated average output voltage is unity, the normalized rated output current is unity and the normalized time of $2\pi$ corresponds to the undamped natural period of the inductor-capacitor combination in the un-normalized converter power stage of FIG. 1. In a system normalized in this manner, the magnitudes of all the voltages represent some portion of the desired average output voltage. Thus, an input voltage of 0.75 corresponds to a voltage of 75% of the desired average output voltage, and an instantaneous peak output voltage of 1.05 corresponds to an output voltage overshoot of 5%. Likewise, the values of all normalized system currents represent some multiple of the rated output current, and a reactor current of 2.0 corresponds to twice the rated current, whereas a current of 0.5 corresponds to one-half of the rated output current. The third normalization factor, $T_{ref} = \sqrt{LC}$, enables a quick evaluation of the converter switching frequency relative to the natural frequency of the power delivery system. This is an important consideration when designing switching power delivery systems, and normally the successful operation of such systems is dependent on having a switching frequency considerably higher than the natural frequency of the LC combination in the power stage. Thus the switching period of the normalized system should be considerably less than $2\pi$ to meet this criterion. Most of the data presented in this application is in normalized form, and the symbols introduced in FIG. 2 with the subscripts N are used to distinguish normalized variables and parameters from their un-normalized counterparts. Normalized circuit parameters and variables are set forth below FIG. 2.

In order to make a physical system amenable to a mathematical analysis, the physical system must be modeled in such a way as to capture those aspects of the system behavior which are essential to its operation and which, additionally, focus attention on characteristics of particular interest. The simplified schematic diagram in FIG. 1 and the normalized network of FIG. 2 are examples of such abstractions of physical DC to DC voltage step-up converter systems. Another useful model of this converter is presented in FIGS. 3A and 3B. In 3A, the converter power stage is illustrated during the time that the power switch Q is closed or "on", while in FIG. 3B the power converter is represented during the time that the power switch Q is open or "off". The models portrayed in FIGS. 3A and 3B have relatively simple mathematical representations as noted by the equations below each of these figures, but at the same time retain the essential behavior characteristics of the actual physical system in question. For the sake of convenience, these simplified models are used in the following discussion. It should be noted, however, that the validity of the theoretical treatment presented is not dependent upon the particular simplified converter models depicted in these figures for the same arguments and equivalent data can be generated for on-off switching power delivery system models of any arbitrary complexity.

Figure 3A:
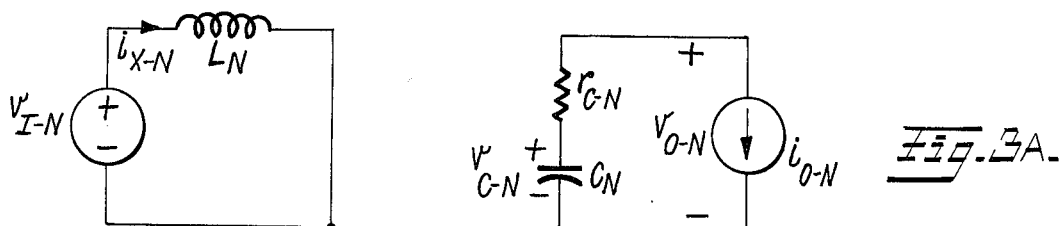
FIGS. 3A and 3B are simplified schematic circuit illustrations of the power converter of FIG. 1 during switch-on operating conditions (FIG. 3A) and during switch-off operating conditions (FIG. 3B)
Figure 3B:
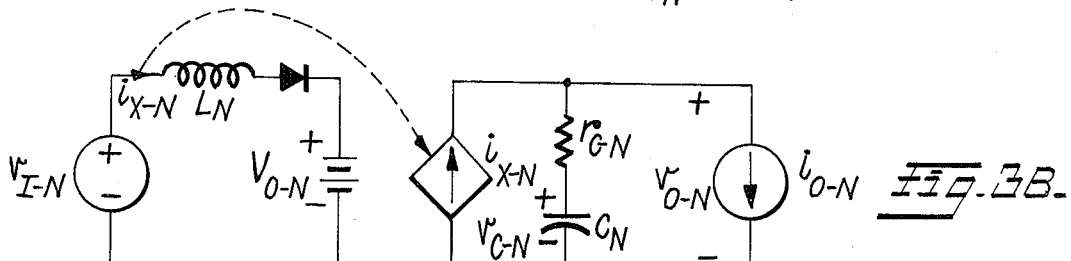

As can be surmised from FIGS. 3A and 3B, the power switches in the converter are assumed to be ideal; i.e. they switch between ideal open circuits and ideal closed circuits instantly on command. Likewise the diodes are assumed to be ideal with no losses and no switching delays. These two approximations enable a convenient piecewise-linear treatment of the circuits which readily can be justified given the quality of currently available semiconductor switching devices. In addition, the converter output voltage is assumed to be sufficiently well-regulated in the case of a constant load resistance that the load can be represented as a constant current sink, and when $v_{I-N}$ is constant, the inductor current can be assumed to rise with a constant slope during the time the switch is on and fall with a constant slope during the time the switch is off. This triangular inductor current $i_{X-N}$ is used, in conjunction with the independent output current $i_{O-N}$, to compute the current into the capacitor $C_N$ and subsequently the capacitor voltage $v_{C-N}$. The mathematical representation of the model shown in FIGS. 3A and 3B are given below the respective diagrams in the form of pairs of first order differential equations and the solutions to these state equations are algebraic functions of time. The primary justification for the assumptions on the shape of the inductor current and the magnitude of the peak to peak output voltage ripple relative to its average value can be found in the design restrictions stated above that the converter switching frequency should be at least one order of magnitude greater than the natural frequency of the inductor-capacitor combination in the converter power stage. A more detailed discussion of these assumptions and their effect on the accuracy of analysis performed using such assumptions, can be found in the open literature. See for example, the paper entitled "A General Unified Approach to Modelling Switching-Converter Power Stages" by R. D. Middlebrook and S. Cuk appearing in the 1976 IEEE Power Electronics Specialist Conference Record, IEEE publication No. 76 CH 1084-3 AES, pages 18-34, June, 1976. As stated above, the particular model under consideration has been chosen merely for convenience and for the sake of clarity of presentation and is not crucial to the application of the control theory and apparatus which is the subject of this invention. More exact models of the systems to be controlled yield solutions to the state equations which, although trancendental in nature, are equally amenable to the state-space analysis treatment but are less readily visualized without the aid of detailed computation.

Although other choices of system-state variables can be and are employed in practicing the invention, the preferred system-state variables employed in explaining the practice of the invention with the power converter system of FIGS. 1, 2, 3A and 3B are the normalized reactor current $i_{X-N}$ and the normalized capacitor voltage $v_{C-N}$. The behavior of the converter can be represented mathematically by means of a sequence of pairs of differential equations which can be solved explicitly to yield time-domain solutions for the state of the system. The mathematical representations for the models in question are set forth in FIGS. 3A and 3B. If the independent variable, normalized time, is eliminated in the solutions $i_{X-N}(t_N)$ and $v_{C-N}(t_N)$, a sequence of equations of the form $v_{C-N} = g(i_{X-N})$ results in which time is an implicit parameter. These time-implicit equations, when plotted in the state-plane of $i_{X-N}$ versus $v_{C-N}$, define what is called the solution curve or the system-state trajectory. Those portions of the system-state trajectory which result when the power switch is on are referred to as "on-time" trajectories, and those portions corresponding to the power switch being off are referred to as "off-time" trajectories. The complete transient response of this switching on-off controlled power delivery system thus can be portrayed in the state plane as a sequence of connected on-time and off-time trajectories. Normal steady-state operation of this power delivery system is indicated by a closed curve in the state plane consisting of a single on-time trajectory and single off-time trajectory. The complete transient response of switching on-off controlled power delivery systems in general can be portrayed in the system-state space as a sequence of connected trajectory segments, each of which corresponds to a particular combination of on or off states of the plurality of power switches in the system power stage. Normal steady-state operation of such switching power delivery systems is indicated by a closed curve in the state space consisting of a particular combination of trajectory segments which yields the desired system output characteristics.

Figure 4:
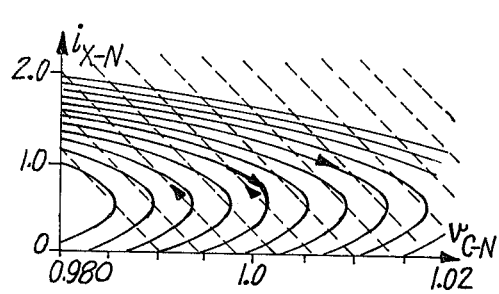
FIG. 4 illustrates the families of on-time trajectories (broken lines) and off-time trajectories (solid lines) in the state-plane of $i_{X-N}$ versus $v_{C-N}$ corresponding to different initial states for the normalized power converter shown in FIG. 2 with $v_{I-N} = 0.75$ and $i_{O-N} = 0.5$ and with the highlighted closed curve in these trajectories identifying the steady-state solution trajectory corresponding to nominal operating conditions for the circuit.

A typical family of on-time and family of off-time trajectories for the particular voltage step-on DC to DC converter of FIG. 1 are illustrated in FIG. 4. The equations for these trajectories are developed in a paper entitled "State-Plane Trajectories Used to Observe and Control the Behavior of a Voltage Step-Up DC to DC Converter" by William W. Burns, III and Thomas G. Wilson presented on June 9, 1976 to the IEEE Power Electronics Specialists Conference and published in the conference Record by the IEEE in September, 1976. The equations for the trajectories also appear in the doctoral thesis entitled "A Theory of Control for a Class of Electronic Power Processing Systems: Energy-Storage DC-to-DC Converters" by William W. Burns, III published by the School of Engineering of Duke University on Apr. 25, 1977. Additional disclosures of interest with respect to this invention are to be given in papers entitled "Analytic Derivation and Evaluation of a State-Plane Trajectory Control Law for DC-to-DC Converters" by William W. Burns, III and Thomas G. Wilson, and "Fast-Response Free-Running DC-to-DC Converters Employing a State-Trajectory Control Law" by Stephen D. Huffman, William W. Burns, III, Thomas G. Wilson and Harry A. Owen, Jr. to be presented and published as part of the proceedings of the IEEE 1977 Power Electronics Specialists Conference held in San Francisco, California on June 14-16, 1977. The disclosures of the first two publications are expressly incorporated herein by reference.

Each trajectory corresponds to a different pair of initial conditions or initial state of the system. The family of off-time trajectories, whose initial states have been arbitrarily selected as uniformly spaced points along the translated ordinate axis, are shown as solid lines and also include segments of the $v_{C-N}$ axis. Paths such as these are the ones which the system-state must follow whenever the power switch is turned-off. Similarly, the on-time trajectories, shown in FIG. 4 as dashed lines, are the paths which the system-state must follow during the time that the power switch is closed or on. As indicated previously, time is an implicit parameter in these system-state trajectories and, as time increases, the system-state moves in the direction indicated by the arrow heads; i.e. toward decreasing reactor current and peaking capacitor voltage, or simply decreasing capacitor voltage if the reactor current is zero, for the off-time trajectories, and increasing reactor current and decreasing capacitor voltage for the on-time trajectories. Any switching on-off control power delivery system solution curve, or solution trajectory, will be made up of a sequence of such off-time segments and on-time segments.

When modelling the voltage step-in converter as portrayed in FIGS. 3A and 3B, the solution curves are found to be parabolas for the off-time trajectories with reactor current greater than zero and straight lines for the on-time trajectories as derived below. Using Kirchhoff's voltage and current laws, the sequence of state equations corresponding to the model of FIGS. 3A and 3B and illustrated below those figures, can readily be derived. Calling $t_N^o$ the arbitrary initial time and $i_{X-N}(t_N^o)$ and $v_{C-N}(t_N^o)$ the arbitrary initial state variables of the converter, the time domain solution of the network of FIG. 3A for the time interval $T_{on-N}$ that the power switch is closed is $$i_{X-N} = \frac{v_{I-N}}{L_N} t_N + i_{X-N}(t_N^0) \tag{1}$$

$$v_{C-N} = -\frac{i_{O-N}}{C_N} t_N + v_{C-N}(t_N^0).$$

Equation 1 is true for the time period $t_N^o \leq t_N < t_N^o + T_{on-N}$. Let the time instant $(t_N^o + T_{on-N})$ that the power switch opens be called $t_N^1$. Then for that portion of the power switch off-time period $T'_{off-N}$ that the inductor current $i_{X-N}$ is greater than zero in FIG. 3B, the solutions for the two system-state variables are $$i_{X-N} = -\frac{V_{O-N} - v_{I-N}}{L_N} t_N + i_{X-N}(t_N^1) \tag{2}$$

$$v_{C-N} = -\frac{V_{O-N} - v_{I-N}}{2 L_N C_N} t_N^2 + \frac{i_{X-N}(t_N^1) - i_{O-N}}{C_N} t_N + v_{C-N}(t_N^1)$$

For the time period $t_N^1 \leq t_N < (t_N^1 + T'_{off-N})$.

If the time instant $(t_N^1 + T'_{off-N})$ that the inductor current $i_{X-N}$ falls to zero and the diode D becomes reverse biased or "open" be called $t_N^2$, then, for that portion of the switch off-time period $T''_{off-N}$ that the inductor current $i_{X-N}$ is equal to zero in FIG. 3B, the solutions for the two system-state variables are $$i_{X-N} = 0 \tag{3}$$

$$v_{C-N} = -\frac{i_{O-N}}{C_N} t_N + v_{C-N}(t_N^2)$$

for the time period $t_N^2 \leq t_N < (t_N^2 + T''_{off-N})$.

To simplify the above notation for subsequent derivations, the values of inductor current and capacitor voltage at the switch-on and switch-off instants when the converter is operating in steady-state are defined as follows:

$$i_{X-N}(t_N^o) = i_{A-N}$$

$$v_{C-N}(t_N^o) = v_{A-N} \tag{4}$$

$$i_{X-N}(t_N^1) = i_{B-N}$$

$$v_{C-N}(t_N^1) = v_{B-N} \tag{5}$$

It should be noted that if the converter is operating in the continuous conduction mode, the inductor current never falls to zero and only two sets of equations (1) and (2) are needed to completely describe the system operation.

The independent variables $t_N$ in each of the pairs of solutions presented above can be eliminated to yield the following sequence of equations which defines the system-state trajectory during each of the three possible time intervals, where again only the first two are appropriate if the system is operating in the continuous conduction mode.

$$v_{C-N} = -\frac{L_N i_{O-N}}{C_N v_{I-N}} i_{X-N} + K_1 \tag{6}$$

$$v_{C-N} = -\frac{L_N}{2 C_N (V_{O-N} - v_{I-N})} i_{X-N}^2 + \tag{7}$$

$$\frac{L_N i_{O-N}}{C_N (V_{O-N} - v_{I-N})} i_{X-N} + K_2$$

$$i_{X-N} = 0 \tag{8}$$

$K_1$ and $K_2$ are constants which are functions of the circuit component values, the converter operating conditions, and the particular initial states for the respective switching intervals. For steady-state operation, the values of $K_1$ and $K_2$ are given by:

$$K_1 = \frac{L_N i_{O-N}}{C_N v_{I-N}} i_{A-N} + v_{A-N} \tag{9}$$

$$K_2 = \frac{L_N}{2 C_N (V_{O-N} - v_{I-N})} i_{B-N}^2 - \tag{10}$$

$$\frac{L_N i_{O-N}}{C_N (V_{O-N} - v_{I-N})} i_{B-N} + v_{B-N}$$

For the particular switching on-off control power delivery system shown in FIG. 1, the system on-time trajectories are defined by equation (6) which gives a family of straight lines shown in FIG. 4. Likewise, the portions of the off-time trajectories which occur during $T'_{off-N}$ are defined by equation (7) which gives the family of parabolas shown in FIG. 4. The portions of off-time trajectories corresponding to $T''_{off-N}$ are defined by equation (8) and are simply segments of the $v_{C-N}$ axis with the direction of movement of the system-state when on this axis being towards the origin of the plane. The trajectories defined by equation (8) occur during the zero current dwell time of the system when operating in the discontinuous conduction mode.

The trajectories plotted in FIG. 4 are shown only in a localized region of the state-plane with a voltage range of about plus or minus 2% of the rated output voltage and a current range of zero to two times the rated output current. This particular region of the system-state plane is displayed because it includes the steady-state trajectories of the example converter operating over the specified input voltage and output current range. The steady-state trajectory highlighted with bold lines near the center of FIG. 4 is seen to be comprised of segments of one off-time trajectory and one on-time trajectory. The particular closed trajectory illustrated there corresponds to steady-state operation in the continuous conduction mode at half the rated output current and with an input voltage equal to 75% of the rated output voltage. The steady-state operation thus illustrated is used as a reference condition in subsequent illustrative data.

Given any initial state within the system-state plane as illustrated in FIG. 4, the transient trajectory which the system state follows in attempting to reach a steady-state condition is determined by the sequence of power switch closings and openings as established by the power delivery system controller. As long as the power switch is off, the system state must follow the particular off-time trajectory which passes through the state at the instant the switch is opened. At the instant the switch is turned-on, the state must begin to follow the particular on-time trajectory which passes through the final state of the preceeding off-time trajectory. In this manner, the state of the system alternately follows off-time and on-time trajectories around the state-plane and eventually, if the power delivery systen is functioning properly, converges to a closed steady-state trajectory such as is illustrated in bold lines in the center of FIG. 4.

Figure 4A:
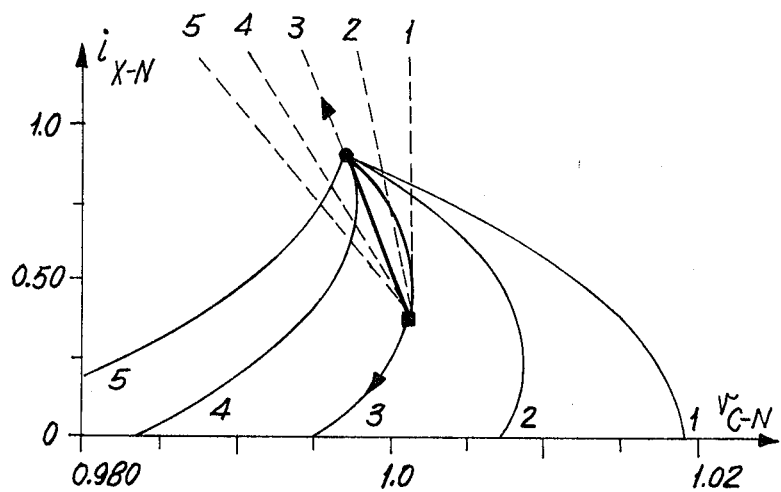
FIGS. 4A and 4B illustrate changes in the shape of the on-time trajectories (dashed lines) and off-time trajectories (solid lines) for the voltage step-up converter of FIG. 1 in FIG. 4A with input voltage of $V_{I-N}$ constant at 0.75 and output current $i_{O-N} =$ (1) 0.0, (2) 0.25, (3) 0.5, (4) 0.75 and (5) 1.0 and in FIG. 4B with output current $i_{O-N}$ constant at 0.5 and input voltage $V_{I-N} =$ (1) 0.1, (2) 0.25, (3) 0.5, (4) 0.75 and (5) 0.9.
Figure 4B:
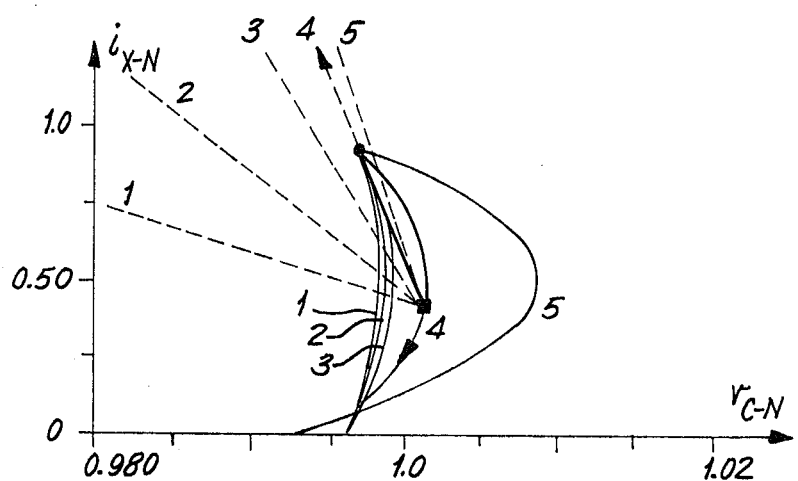
Figure 10:
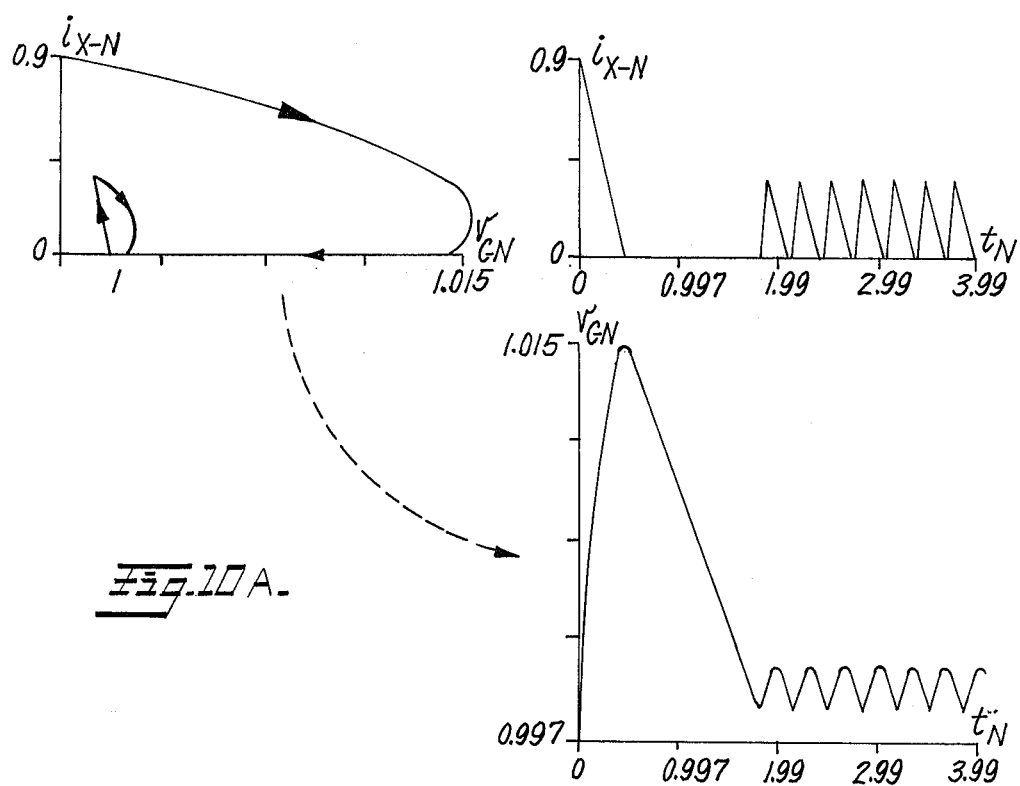
FIG. 10A is a computer simulation generated response of the free running converter system of FIG. 7 for a step decrease in output load current $i_{O-N}$ from 0.5 to 0.1 and also illustrates translation of the state-plane plot to the more conventionally known voltage and current versus time characteristic wave shapes.
FIG. 10B is a computer simulation generated response of the free running converter system of FIG. 7 for a step increase in load current $i_{O-N}$ from 0.5 to 1.0 and also shows the translation of the voltage and current to the familiar voltage and current versus time characteristic waveshapes.
Figure 10:
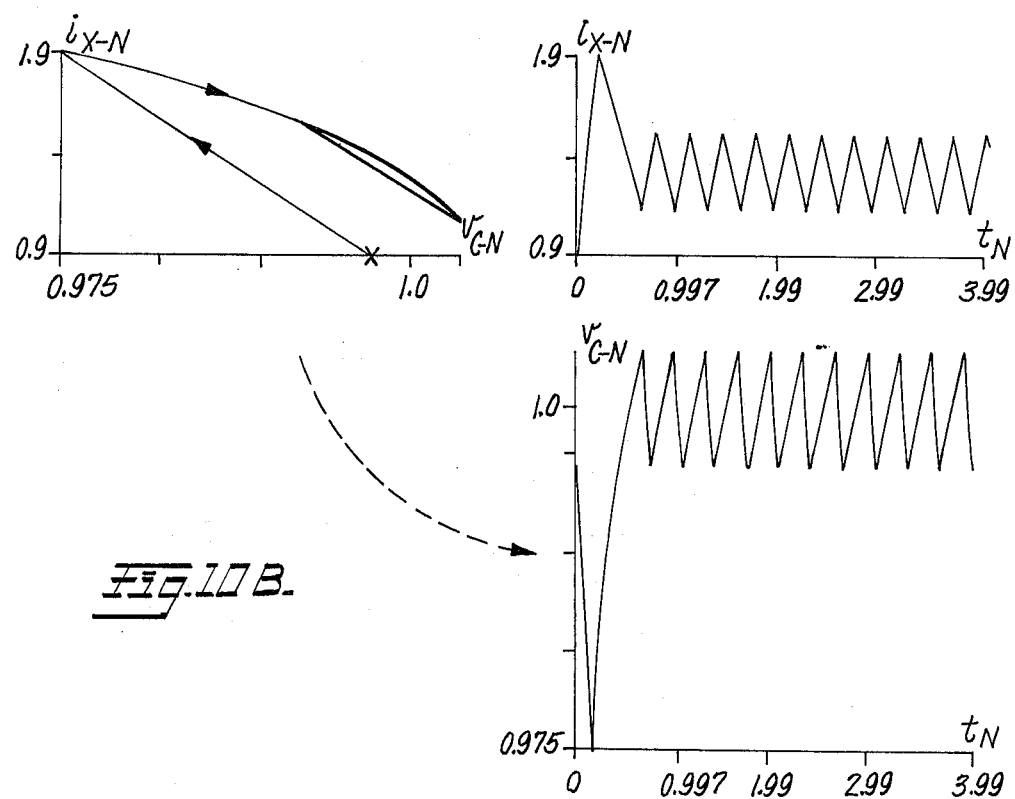

As discussed previously, time is an implicit parameter in the system-state trajectories, and it can be extracted, if desired, to reveal the more familiar current and voltage versus time waveforms. The relationship between a system-state trajectory and its corresponding time waveforms is illustrated in FIGS. 10A and 10B of the drawings. It should be noted in regard to these figures that the distance traversed by the system's state in the state plane is not necessarily a good indication of the length of time required to accomplish that movement. The state of the system can move quickly or slowly around the state plane as determined by the system time constants which are revealed in the state equations. As discussed in the preceding paragraphs, the shapes of the power delivery system's state trajectories are well defined and known functions of network parameters, such as the system inductance and capacitance, and of the externally imposed operating conditions such as the source voltage and the load current. Thus, a change in a system parameter or, more likely, a change in operating conditions causes the shapes of these trajectories to change accordingly. For example, FIG. 4A of the drawings illustrates how, starting from common initial states, the shapes of the off-time and on-time trajectories for the voltage step-up converter of FIG. 1 change when the converter output current increases from no load to full load. In these plots the changes in shape of on-time trajectories (dashed lines) and off-time trajectories (solid lines) are illustrated for the voltage step-up converter of FIG. 1 all for a constant input voltage $v_{I-N} = 0.75$ and an output current $i_{O-N} =$ (1) 0.0, (2) 0.25, (3) 0.5, (4) 0.75, (5) 1.0. The initial state for the off-time trajectory indicated by the dot in the figure, corresponds to the instant in the steady-state cycle of FIG. 4 when the power switch turns off. Likewise, the initial state for the five on-time trajectories indicated by the square in the figure, is chosen as the switch-on instant in the same steady state cycle. This referenced steady-state solution trajectory can also be seen in FIG. 4A as the solid closed curve made up of segments corresponding to one-half of the rated output current and indicated on the figure as load condition No. 3. Note that the range of the reactor current $i_{X-N}$ in this figure is 0–1 units rather than 0–2 units as in FIG. 4 so that the steady-state trajectory appears elongated in the vertical direction. A similar example of how the shapes of the trajectories change for various values of input voltage is illustrated in FIG. 4B where the same initial states are used with output current $i_{O-N}$ held constant at 0.5 and the input voltage $v_{I-N} =$ (1) 0.1, (2) 0.25, (3) 0.5, (4) 0.75, and (5) 0.9. In this figure the referenced steady-state trajectory is again displayed as a closed curve consisting of segments corresponding to input voltage condition No. 4.

In each of the examples of system-state trajectories presented in the above description, a closed two-segment steady-state trajectory for the given converter system and externally imposed operating condition has been noted. These closed paths (indicated in bold lines in FIG. 4) have been referred to as the desired steady-state trajectories implying that these, and only these trajectories satisfy all of the converter specifications. On examining the positions of the steady-state trajectories in the system-state plane, one can see that they are more or less centered above the voltage $v_{C-N} = 1.0$ and about some value of reactor current $i_{X-N}$ which is commensurate with the output required. A method for determining the exact location of the desired steady-state trajectory that satisfies a given converter specification will be presented hereinafter. It is sufficient for the present purpose to point out that the position and shape of the steady-state trajectory of a power delivery system operating under a given set of externally imposed operating conditions, will change, as do the shapes of the on-time and off-time trajectories in general, when there is a change in the externally imposed operating conditions.

Figure 5A:
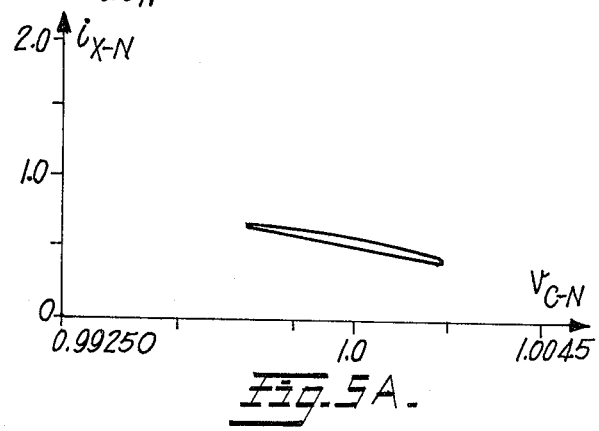
FIGS. 5A, 5B and 5C illustrate the steady-state trajectory in the state-plane for the converter of FIG. 1 operating at $V_{I-N} = 0.75$ and $i_{O-N} = 0.5$ and with successively smaller values of inductance (5A) $L_N =$ 0.1597, (5B) $L_N = 0.1136$ and (5C) $L_N = 0.0505$.
Figure 5B:
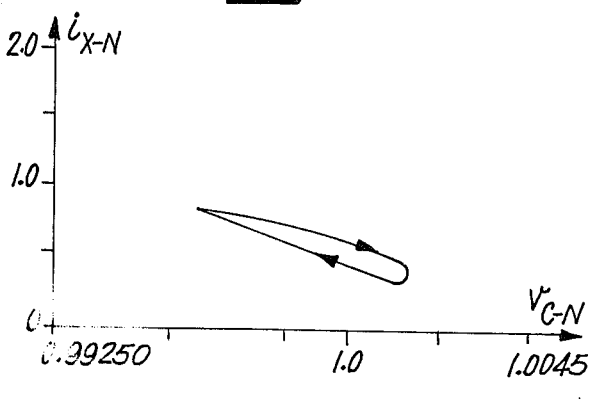
Figure 5C:
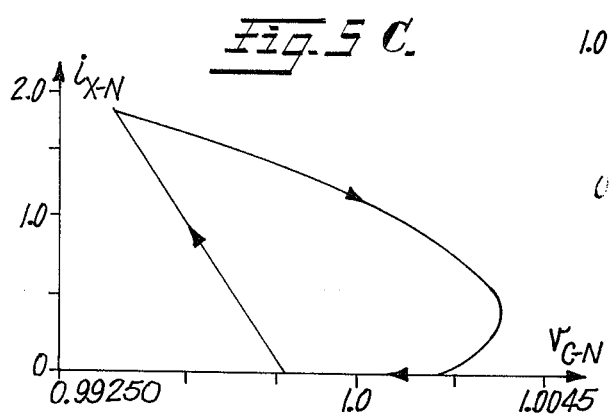

As mentioned previously, the shapes of the system-state trajectories, in addition to depending on the externally applied circuit operating conditions, are also dependent on the values of the system parameters. Of particular interest to power delivery system designers has been the effect of changing the value of the energy-storage inductance. The value of inductance often is chosen to insure converter operation in either the continuous or the discontinuous conduction mode over a specified range of operating conditions. FIGS. 5A, 5B, and 5C illustrate the steady-state trajectories including the off-time segment and the on-time segment for three different values of inductance for the voltage step-up power converter of FIG. 1 wherein the applied input voltage $v_{I-N} = 0.75$ and output current $i_{O-N} = 0.5$ and successively smaller values of inductance (5A) $L_N = 0.1597$; (5B) $L_N = 0.1136$ and (5C) $L_N = 0.0505$. As shown in FIGS. 5A and 5B, for relatively large values of inductance, steady-state operation is in the continuous conduction mode. With sufficiently small values of inductance, the steady-state operation of the converter is in the discontinuous conduction mode as shown in FIG. 5C where the solution trajectory incorporates a portion of the axis of abscissas corresponding to zero reactor current during a portion of the power switch-off time. Thus, it is apparent that the three converters exemplified by these figures, which are identical in all respects except for the values of inductance, accomplish the same power processing task but in markedly different manners which are consistent with the requirement of the individual shapes of their respective on-time and off-time trajectories.

In the preceding description with relation to FIG. 4 of the drawings, families of off-time and on-time trajectories for switching on-off controlled power delivery systems were described along with a particular combination of an off-time and on-time trajectory segments which together yield a closed path in the system-state plane (shown in bold lines in FIG. 4) and is referred to as the desired steady-state trajectory for the given power delivery system operating at a designer's specified switching frequency, and externally imposed input voltage and output current. This steady-state trajectory centers about 1.0 on the $v_{C-N}$ axis and about a value of reactor current which is commensurate with the power delivery system input and output conditions on the $i_{X-N}$ axis. No other closed path in the system-state plane can precisely meet these conditions at the specified operating frequency, and consequently it is used as the cornerstone for the development of the state-trajectory control law as described below.

Figure 6A:
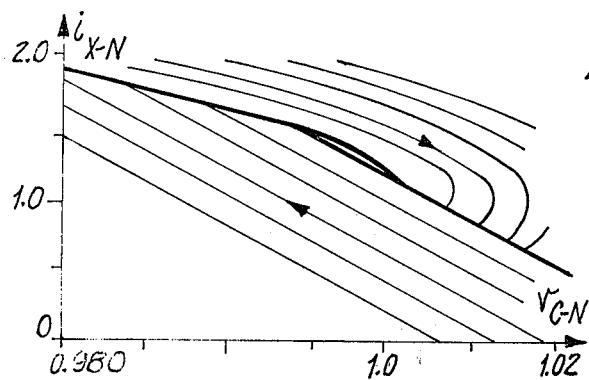
FIGS. 6A, 6B and 6C illustrate the off-time and on-time trajectories plotted in the state-plane for the converter configuration of FIG. 1 with $V_{I-N} = 0.75$ and $i_{O-N} =$ (6A) 1.0, (6B) 0.5 and (6C) 0.1, respectively and wherein the bold lines shown in each plot separate the on-time region from the off-time region of the state plane.
Figure 6B:
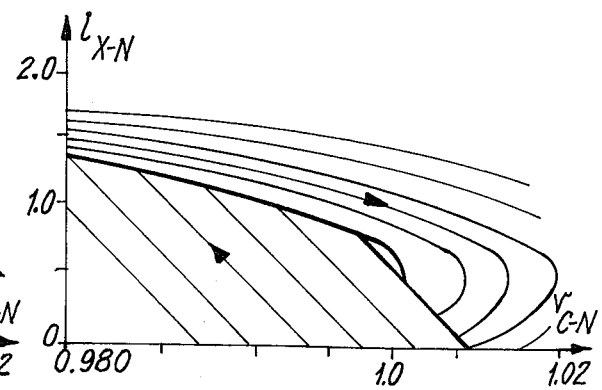
Figure 6C:
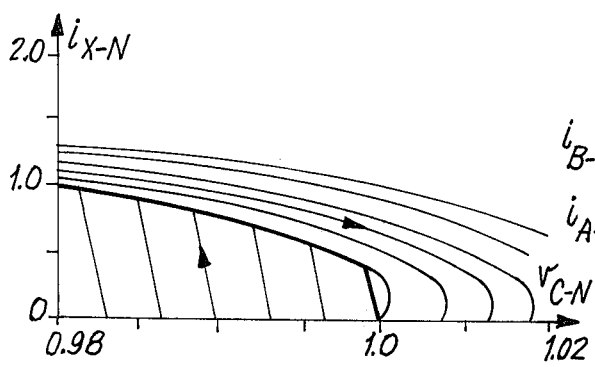
Figure 11:
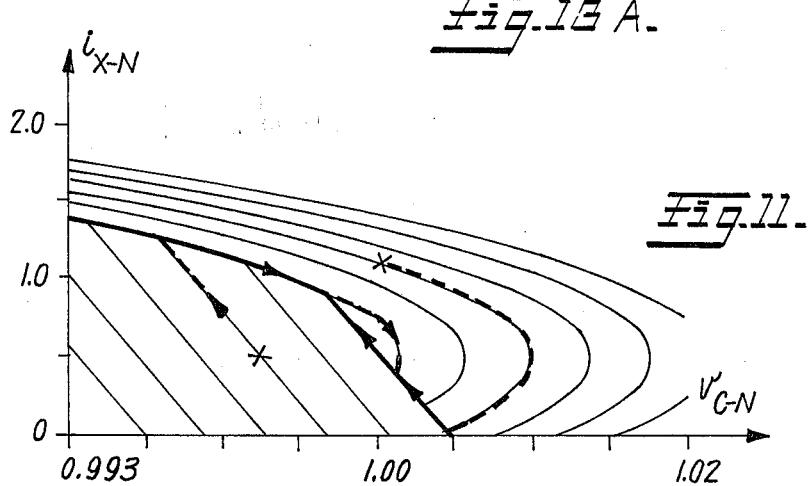
FIG. 11 is a plot in the state-plane for the converter and control system of FIG. 7 showing two examples of transient trajectories which reach steady-state operation in one switching control cycle with the initial state of the system being indicated by an X.
Figure 13:
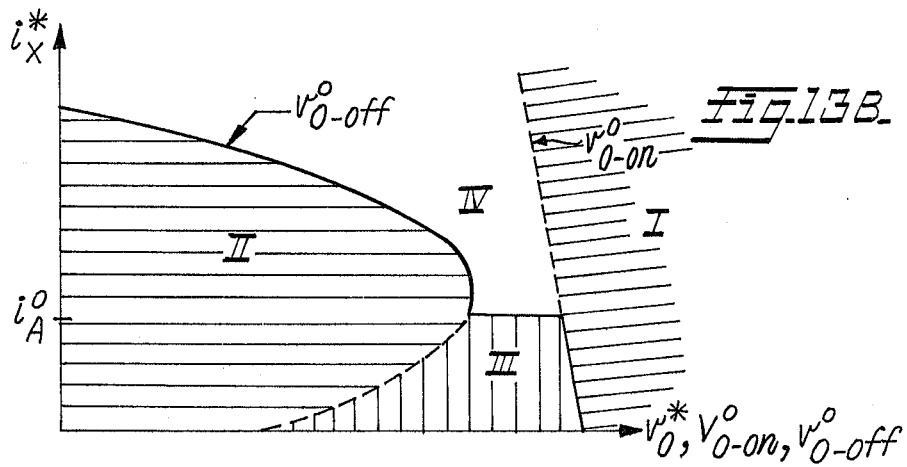

The on-off switching criterion employed by the state-trajectory control law made available by the present invention, is illustrated in FIGS. 6A, 6B and 6C of the drawings for the voltage step-up DC to DC power converter of FIG. 1 with an input voltage $v_{I-N} = 0.75$ and an output current $i_{O-N} =$ (6A) 1.0, (6B) 0.5, and (6C) 0.1. These figures again display on-time and off-time trajectories for the voltage step-up converter of FIG. 1; however, in the case of FIGS. 6A–6C the state plane has been divided into two regions, with the off-time trajectories being confined to the upper right hand region and the on-time trajectories to the lower left. The boundary between the regions consists of segments of a particular off-time trajectory and a particular on-time trajectory which are shown as bold lines in each of FIGS. 6A–6C. The particular trajectories chosen to construct this boundary line in the $i_X$ versus $v_C$ state plane are the ones that also include the steady-state off-time and on-time trajectory segments which yield the desired converter output characteristics for the given operating conditions. The actual desired steady-state trajectory for the power converter of FIG. 1 operating with $v_{I-N} = 0.75$ and $i_{O-N} = 0.5$ is represented by the closed curve at the intersection of the two segments that make up the boundary line in FIG. 6B. The steady-state trajectory shown in this figure corresponds to the same steady-state trajectory shown in FIG. 4 and that has been discussed throughout the description as thus far completed. The information contained in FIGS. 6A–6C can be used to determine an on-off switching controlled power delivery system switching sequence which enables the power delivery system to achieve a desired steady-state operation in one on-off switching cycle of control, regardless of the system's initial state and for any externally imposed operating conditions. For example, if the initial state of the power delivery system is in the region of the plane below the boundary line shown in FIG. 6A, for example, and if the control law is such that the power switch is closed when the state of the system is in this region, the system's state must follow the corresponding on-time trajectory upward and to the left toward the bold boundary line. If, in addition the controller is such that it uses this boundary as a switch on-off line, the power delivery system power switch opens the instant that the state of the system reaches this boundary and the off-time trajectory which coincides with the boundary line is subsequently followed during the off state of the system. These two situations are illustrated in FIG. 11 of the drawings which will be discussed more fully hereinafter. If the controller likewise uses the on-time segment of the boundary line as a switch-on line, the system state immediately converges to the steady-state trajectory shown in the centers of FIGS. 6A–6C and FIG. 11. Similarly, if the the control law is such that the power switch is off whenever the system state is above the boundary line, a system state in this upper region must initially follow an off-time trajectory until the switch-on boundary is reached. At that instant the power switch closes and the on-time trajectory which coincides with the boundary line is followed to the desired steady-state closed trajectory. Accordingly, it is believed evident from a consideration of FIGS. 6A–6C and FIG. 11 that if the boundary is used as an on-off switching line for the power delivery system, the desired system's steady-state trajectory of operation can be reached within one precisely determined cycle of control; i.e., with one on-time and one off-time, or vice-versa, depending on which region of the state-plane contains the initial state of the power delivery system.

No timing restrictions are imposed on the power delivery system power switch during the transient trajectories so that the switch can remain open or closed for as long a period as needed for the system state to reach the switching boundary. Any switching prior to the intersection of the system state with this boundary, whether it is caused by a controller timing constraint or a fixed boundary reference level which was chosen to accommodate some other operating characteristic, can only cause delays in attaining the desired steady-state operating condition, or in some cases, such constraints could cause the state of the power delivery system to converge to some other undesired equilibrium or unstable condition. As a further observation with respect to FIGS. 6A–6C and FIG. 11, it will be appreciated that no matter how far the initial state of the power delivery system is from the new desired steady-state equilibrium condition, the direction of movement of the system-state is always towards the boundary switching line rather than away from it, and thus power delivery systems operating in conjunction with the new control law are inherently stable in operation for the most part.

To implement the control concept described in the preceeding paragraphs, one must be able to determine precisely for a given power delivery system and set of given operating conditions, the location of the steady-state trajectory in the system-state plane which yields the desired power delivery system output characteristics. As demonstrated in the preceeding discussion, the location of this steady-state trajectory is very much dependent on the values of the power delivery system input voltage, output current, and the values of the power delivery network components in the power delivery system power stage. The location of this steady-state trajectory is also a function of the designer's specified converter steady-state timing parameter in the form of a steady-state operating frequency or a designer's specified power switch on-time or power switch off-time, if these timing parameters are preferred. Because of the piece-wise linear nature of switching on-off controlled power delivery systems such as the voltage step-up DC to DC power converter of FIG. 1, a sufficient criterion for locating the desired steady-state trajectory of the system is to specify the system state at the instant that the power switch should be turned-off. This steady-state switch-off point is the initial state for the system off-time trajectory and the final state for the on-time trajectory for each cycle of steady-state operation of the system. Thus, since only one off-time trajectory and on-time trajectory can pass through a given point in the system-state plane of $i_{X-N}$ versus $v_{C-N}$, specifying this point completely identifies the system's steady-state trajectory location. The steady-state switch-on point corresponding to this desired system steady-state trajectory is simply the lower intersection of the appropriate on-time and off-time trajectories for continuous conduction operation, or the intersection of the on-time trajectory with the $v_{C-N}$ axis for discontinuous conduction operation.

Figure 8:
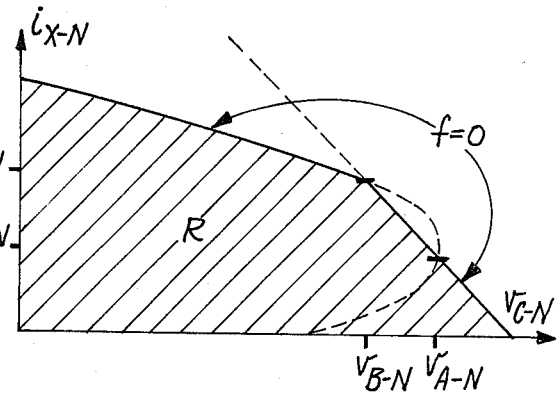
FIG. 8 is a plot in the state-plane of the system-state variables defining the function $f$ and the region R employed in the controller of FIG. 7.

The precise location of the desired equilibrium steady-state switch-off point can be determined from a static analysis of any given power delivery system power stage. The specification of this point takes the form of a pair of algebraic equations which give the power delivery system power stage reactor current $i_{X-N}$ and capacitor voltage $v_{C-N}$ at the steady-state switch-off instant in terms of the system power stage component values, the externally imposed operating conditions, and a designer specified timing parameter. For convenience, the variables in these equations, namely the converter reactor current and the capacitor voltage at the steady-state switch-off point are identified by the symbol $i_{B-N}$ and $v_{B-N}$ and are illustrated in FIG. 8 of the drawings. The equations for these variables are, of course, dependent on the particular model used to describe the actual power delivery system power stage. The equation for the value of the peak reactor current $i_{B-N}$ can be derived from a consideration of the average reactor current and the power switch dutycycle ratio required to yield the desired converter output characteristics. The value of the capacitor voltage at the steady-state switch-off instant, $v_{B-N}$, can be derived from averaging, over one cycle, the expressions for $v_{C-N}$ as a function of time. This averaging procedure yields an expression for the average output voltage, $V_{O-N}$, as a function of $v_{B-N}$, and consequently, $v_{B-N}$ in terms of $V_{O-N}$. Expressions for $i_{B-N}$ and $v_{B-N}$ must be derived for both the continuous and the discontinuous conduction modes of operation if the converter is required to function in both modes over the specified range of operating conditions. If converter operation is restricted to one mode or the other, only the expressions corresponding to that mode are needed to specify the switching boundary for all possible operating conditions. The expressions for deriving $i_{B-N}$ and $v_{B-N}$ for the voltage step-up of DC to DC power converter of FIG. 1 are set forth in the following equations 11 and 12 for the continuous conduction mode and equations 13 and 14 for the discontinuous conduction mode with the converter operated at constant frequency during steadystate operation.

$$i_{B-N} = \frac{i_{O-N} V_{O-N}}{v_{I-N}} + \frac{T_N v_{I-N}(V_{O-N} - v_{I-N})}{2L_N V_{O-N}} \quad (11)$$

$$v_{B-N} = V_{O-N} - \frac{(V_{O-N} - v_{I-N}) i_{O-N} T_N}{2C_N V_{O-N}} - \frac{(V_{O-N} - v_{I-N}) v_{I-N}^3 T_N^2}{12 L_N C_N V_{O-N}^3} \quad (12)$$

$$i_{B-N} = \sqrt{\frac{2T_N i_{O-N}(v_{O-N} - v_{I-N})}{L_N}} \quad (13)$$

$$v_{B-N} = V_{O-N} - \frac{i_{O-N} T_N}{2C_N} + \frac{i_{O-N}}{3C_N} \sqrt{\frac{2i_{O-N} L_N T_N}{(V_{O-N} - v_{I-N})}} \quad (14)$$

The expressions set forth in equations (11)–(14) are all functions of the power stage components $L_N$ and $C_N$, the externally imposed operating conditions $v_{I-N}$ and $i_{O-N}$, the desired average output voltage $V_{O-N}$, and a timing parameter which in equations (11)–(14) is the normalized switching period $T_N$. The shape and location of the steady-state trajectory which satisfies a given set of operating conditions for a power delivery system is very much dependent upon the frequency at which the state of the system switches from the steady-state on-trajectory segment to the off-trajectory segment. As the converter switching frequency increases, the steady-state trajectory contracts about a point which corresponds to the desired average output voltage and the required average reactor current compatible with this desired average output voltage. The timing parameter used to determine the point $(v_{B-N}, i_{B-N})$ is by no means restricted to the switching period $T_N$. As indicated earlier, there are three basis timing specifications which can be incorporated into a particular control function and which are widely used in practical systems. A converter can be designed to operate at a constant frequency with a fixed period $T_N$ or with a constant switch-on time $T_{on-N}$ or a constant switch off-time $T_{off-N}$. Any one of these three timing parameters can be used in specifying the steady-state switch-off point with the resulting power delivery steady-state behavior displaying the appropriate timing characteristics. Operational timing characteristics in conventionally controlled power delivery systems are normally achieved by using explicit elements such as frequency clocks or monostable multi-vibrators in the controller. The state-trajectory control law presented herein requires no such timing element, however, and yet possesses inherent timing characteristics which allow the system to achieve desired steady-state operation implicitly, by incorporating the appropriate timing parameter in the equations which determine the power delivery system steady-state switch-off point. Thus, systems operating in conjunction with the control law made available by the present invention are free-running in the sense that no external timing elements are involved in the switching decisions but at the same time they can be designed to operate in any one of the three different timing modes mentioned above during steady-state operation over the entire range of externally imposed operating conditions. However, the free-running nature of the controller allows it to close or open the power delivery system power switch at appropriate points on the system-state plane trajectory for as long as needed during transient conditions to move the power delivery system state from a first or initial steady-state condition to a second, different steady-state condition in a single switching on-off cycle. As mentioned previously, it is very often the timing restrictions imposed on conventional controllers which cause them to prevent the system from responding adequately to severe transient disturbances. By eliminating these restrictions, the controller comprising the present invention further enables the power delivery system to achieve its maximum performance capability as established by the physical laws of the power stage.

Having determined the steady-state switch-off point pursuant to equations (11) and (12) for the continuous conduction mode of operation and equations (13) and (14) for the discontinuous mode of operation, the state-plane switching boundary is established by selecting the system off-time and on-time state-plane trajectories which pass through that point. This selection is accomplished mathematically by substituting the derived values of $i_{B-N}$ and $v_{B-N}$ into the expressions for $K_1$ and $K_2$ in equations (9) and (10). It should be noted that the expressions for $K_1$ involve $i_{A-N}$ and $v_{A-N}$ rather than $i_{B-N}$ and $v_{B-N}$. However, since both the steady-state switch-on point identified by $i_{A-N}$ and the steady-state switch-off point identified by $i_{B-N}$ must be on the same on-time trajectory as shown in FIG. 8, the two points can be used interchangeably. Thus, the power stage switching signals for the power delivery system, for both steady-state and transient operation, are issued when the system-state trajectory intersects this well-defined switching line identified by the particular power delivery system power handling network component values, desired output characteristics and externally imposed operating conditions including the designer specified timing parameter.

Figure 7:
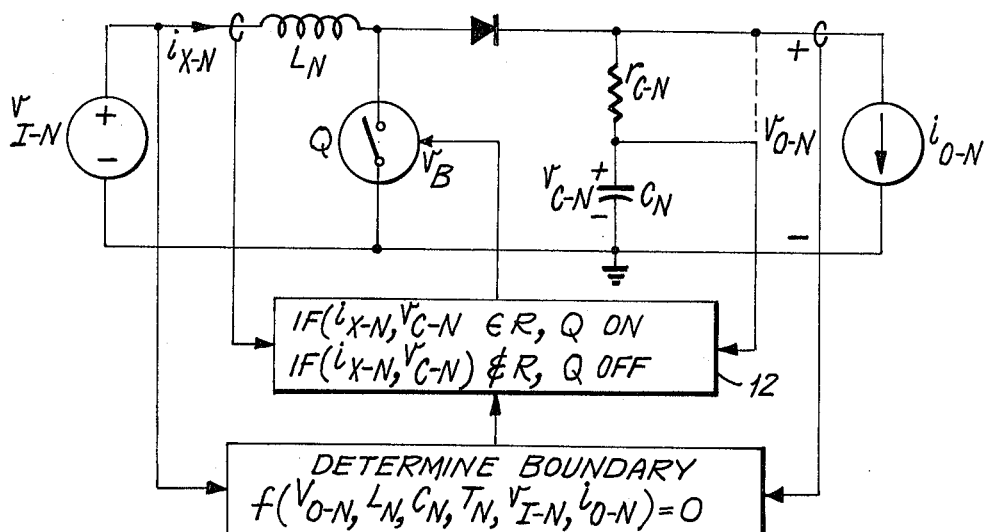
FIG. 7 is a simplified, schematic conceptual diagram of a free running controller and voltage step-up converter constructed according to the invention.

FIG. 7 is a schematic, functional block-circuit diagram of a novel free-running controller for a voltage step-up DC to DC power converter constructed according to the invention. As illustrated schematically in FIG. 7, four sensed signal inputs from the converter power stage are supplied to the controller for use in evolving the on-off switching control signals supplied to the power switch Q of the converter. These sensed input signals correspond to the two externally imposed operating conditions of the system, input voltage $v_{I-N}$ and output current $i_{O-N}$, and the system's state variables, the capacitor voltage $v_{C-N}$ and the reactor current $i_{X-N}$.

The controller is comprised of essentially two sections, a boundary computation section 11 and a comparison section 12. The controller may comprise either a special purpose digital computer or a specially programmed general purpose digital computer for achieving both the boundary computation and the comparison functions as will be described hereinafter with respect to FIGS. 12A and 12B, or it may comprise a special purpose analog computer again designed to achieve both the boundary computation and comparison function as will be described hereinafter with respect to FIG. 14 of the drawings, or a hybrid combination of digital and analog boundary computation and comparison functions. The instantaneous values of input voltage $v_{I-N}$ and output current $i_{O-N}$ are used in conjunction with the power handling network component values $L_N$, $C_N$, the designer-specified timing parameter $\tau_N$, and the desired average output voltage $V_{O-N}$ to derive the two-segment boundary switching trajectory derived in accordance with the preceeding paragraph from equations (9) and (10). The two-segment boundary trajectory switching line derived pursuant to equations (9) and (10) in the above-described manner is illustrated graphically by FIG. 8 of the drawings by the functional representation $f(V_{O-N}, L_N, C_N, \tau_N, v_{I-N}, i_{O-N}) = 0$ where $\tau_N$ represents the designer's specified timing parameter. The comparator section 12 of the controller compares the measured value of the state variables $v_{C-N}$ and $i_{X-N}$ to this computed switching boundary and turns the converter power switch on if the state of the system is in the region R shown in FIG. 8 and turns the converter power switch off if the system-state is in some region of the system-state plane other than region R. Since the values of the externally imposed operating conditions are continuously monitored, any change in these conditions is reflected immediately as a change in the switching boundary and consequently the power delivery system switching sequence. Thus, all delays in the response of the power delivery system to transient disturbances are eliminated. Such delays in response often occur in conventionally controlled systems which must wait for the disturbance to manifest itself in some internal system signals before its associated controller can react to regulate the system.

As described above, to determine whether or not the state of the power delivery system at any given instant is contained within region R of the state-plane plot shown in FIG. 8, the state variables $i_{X-N}$ and $v_{C-N}$ must be continuously monitored and their values supplied to the comparator stage 12 of the controller. As mentioned previously, the ideal capacitor voltage $v_{C-N}$ which has been used principally to facilitate explanation of the basic concepts of the invention usually is not readily physically obtainable, and thus the actual output voltage $v_{O-N}$ is employed as an alternative input (indicated by dotted lines) to the controller of the power delivery system shown in FIG. 7. In this case the function $f$ must be modified appropriately to yield a function $f'$ which accommodates the effect of the capacitor equivalent series resistance $r_{C-N}$. The expressions for the function $f$ are set forth below as equations (15) and (16) and the modified function $f'$ appears as equations (17) and (18).

$$f = -\frac{L_N}{2C_N(V_{O-N} - v_{I-N})}(i_{X-N}^2 - i_{B-N}^2) + \frac{i_{O-N}L_N}{C_N(V_{O-N} - v_{I-N})} \quad (15)$$
$$(i_{X-N} - i_{B-N}) + v_{B-N} - v_{C-N} \text{ for } i_{X-N} \geq i_{B-N}$$

$$f = -\frac{i_{O-N}L_N}{v_{I-N}C_N}(i_{X-N} - i_{B-N}) + v_{B-N} - C-N \text{ for } i_{X-N} < i_{B-N} \quad (16)$$

$$f' = -\frac{L_N}{2C_N(V_{O-N} - v_{I-N})}(i_{X-N}^2 - i_{B-N}^2) + \frac{i_{O-N}L_N}{C_N(V_{O-N} - v_{I-N})} \quad (17)$$
$$(i_{X-N} - i_{B-N}) + v_{B-N} - v_{O-N} - i_{O-N}r_{C-N} \text{ for } i_{X-N} > i_{A-N}$$

$$f' = -\frac{i_{O-N}L_N}{v_{I-N}C_N}(i_{X-N} - i_{B-N}) + v_{B-N} - v_{O-N} + \rightarrow$$
$$(i_{X-N} - i_{O-N})r_{C-N} \text{ for } i_{X-N} \leq i_{A-N}$$

System-state trajectories and switching boundaries for the voltage step-up DC to DC power converter of FIG. 1 are shown in FIGS. 6A, 6B and 6C for three different load conditions. If the system is operating in steady-state at 50% of the rated output current, the system-state will follow the closed trajectory shown at the center of FIG. 6B. If the load current thereafter is reduced to 10% of the rated value, the trajectories plotted in FIG. 6C subsequently will be followed and the bold switching line there shown should be used in computing the on-off switching decision by the controller. Similarly, if the load current is increased to 100% of its rated value, the system-state trajectories shown in FIG. 6A will be followed, and if the on-off switching boundary line shown in that figure is used to determine the power transfer system switching sequence, the steady-state trajectory in the upper central portion of that figure will result. For each of the different externally imposed load conditions, the steady-state trajectory of the system displayed adjacent to the intersection of the switch-off and switch-on boundary line yields the desired average voltage $V_O$.

The transient characteristic of the novel power delivery system shown in FIG. 7 is illustrated in FIG. 8A and FIG. 8B for step changes in output load current and in FIGS. 9A and 9B for step changes in input voltage. Consider first that the system is operating in a steady-state manner under the conditions depicted in FIG. 6B at 50% of the rated output current. If at this point, the load current suddenly is reduced to 10% of its rated value, the transient state trajectory which results while the system is operating under the influence of the on-off switching boundary state-trajectory controller of FIG. 7, is illustrated in FIG. 8A. The trajectories and the switching boundaries shown in FIG. 8A are the same as those displayed in FIG. 6C since they are in fact dictated by the change in externally applied operating conditions. The original steady-state trajectory under which the system was operating pursuant to the conditions of FIG. 6B is superimposed on FIG. 8 as a dashed closed curve. Assume that the change in load current arbitrarily occurs when the system-state is at the point marked with an X in FIG. 8A. At that instant, the switching boundary and the system trajectory derived by the switching boundary computation section 11 of the novel controller changes dynamically to accommodate the change in load current and the system-state begins to follow the new off-time trajectory which passes through the state of the system at that instant. The reactor current eventually falls to zero at which time the power stage diode becomes reverse biased and the output capacitor voltage decays along the $v_{C-N}$ axis until the appropriate new switch-on boundary line is reached. At this point a switch-on signal is issued by the controller, and the new steady-state condition (which is in the discontinuous conduction mode), is attained within one on-off switching cycle of control. It should be noted that no matter when the change is externally applied load condition occurs within the original steady-state trajectory, whether it be during a power switch-on time or a switch off-time, the power switch, if it is not already in the off-state is immediately turned-off at that instant because the original steady-state trajectory is suddenly located entirely within the newly defined off region of the controller. This response characteristic is in contrast to that which is observed with most conventional control techniques which often must wait to complete a fixed on-time or off-time interval before a new control command can be issued. The transient trajectory which is followed by the system-state in response to a step change in load current from 50% to 100% of rated value is illustrated in FIG. 8B of the drawings. In this example, the system-state, at the point of load change, is in the on-region of the newly defined switching boundary immediately following the load change so that the system remains in a turned-on condition until it intercepts the turn-off segment of the newly defined steady-state boundary switching limit, and then tracks down the turn-off segment of the trajectory to reach the new steady-state condition within one on-off switching cycle of control.

Similar principles of operation to those discussed above, apply when the power delivery system of FIG. 7 is subjected to changes in input voltage as illustrated in FIG. 9A and FIG. 9B of the drawings. The system-state trajectories and switching boundaries displayed in FIG. 9A correspond to the power delivery system operating with an input voltage equal to 50% of the desired average output voltage rather than the nominal 75% as depicted in FIG. 6B. The condition depicted in FIG. 9B correspond to an input voltage of 90% of the rated output voltage. In each of these figures, the initial steady-state operating condition of the power delivery system is depicted in the dotted line curve and the change in externally applied input voltage is indicated by an X. In each instance, it will be seen that the system state initially follows along either an on-time trajectory (FIG. 9A) or an off-time trajectory (FIG. 9B) to reach the new desired steady-state operating condition in a single on-off switching control cycle. Thus it is seen that the precise regulation and highly stable operation are achieved in an extremely fast transient switching response to the changed externally applied operating conditions imposed on the system.

Computer simulation of the transient responses of the power delivery system of FIG. 7 to step changes in load current are also illustrated in FIGS. 10A and 10B. FIGS. 10A and 10B also illustrate the translation of the current versus voltage state-plane plot to the more widely known current versus time and voltage versus time operating characteristic curves in order to better illustrate the implicit timing parameter that exists in state-plane functions. FIG. 10A is a computer simulated response of the free running power converter shown in FIG. 7 for a step decrease in load current $i_{O-N}$ from 0.5 to 0.1. The initial state of the power delivery system corresponds to the steady-state condition of the system illustrated in FIGS. 5B and 6B. The computer simulation plots are not to the same scale as the plots shown in FIGS. 5 and 6, however, but one can mentally superimpose the transient trajectory displayed in FIG. 10A onto the plane of FIG. 6C to see how the system-state moves from its initial state under one set of operating conditions to another steady-state trajectory under different operating conditions in a single on-off switching cycle of control. Similarly, one can superimpose the computer simulated transient trajectory of FIG. 10B onto the plane of FIG. 6A to visualize how steady-state operation is achieved in switching to a heavier load condition, again in a single on-off switching cycle of control. FIGS. 10A and 10B in the accompanying time-based waveforms help to illustrate clearly the free-running nature of the power delivery system during the initial on-off transient cycle and thereafter the constant frequency free-running nature during steady-state operation, regardless of the system's initial state or the load condition before and after a change in externally applied operating conditions. Similar plots can be shown in order to illustrate the response of the novel system to step changes in input voltage; however, for the sake of simplicity such plots have not been presented.

As set forth in the preceeding description, the control function made available by this invention can be represented mathematically by means of relatively simple algebraic equations. Consequently, any of the known physical devices or combination of such devices which can generate algebraic functions of measured input signals can be used to physically embody the control concept in a controller that can be used with a whole host of known on-off switch controlled electric power delivery systems. There are a number of different, commercially available electronic components with which the controller can be built in digital, analog, or hybrid form, and which would be capable of processing electronic signals in the manner to be described hereinafter with relation to FIGS. 12A, 12B and FIGS. 14, 14A and 14B. The particular physical implementation illustrated by the flow chart in FIG. 12A, 12B involves digitally computing the state-plane switching boundary and thereafter comparing the position of the monitored state of the system variables to this computed boundary in order to derive desired output on-off switching control signals for application to the power switch of the power delivery system power stage. The implementation depicted in FIG. 12A, 12B may be through the medium of a specially designed special purpose digital computer or, alternately, special programming of a general purpose digital computer although cost-wise the former approach is preferred. The sensed signals from the power delivery power stage which are used in the control decision process are transmitted to the controller through four separate analog to digital converter channels, and the resultant output on-off switching control signal is transmitted back from the controller to the power delivery system via a single digital to analog converter channel. The required mathematical operations are performed sequentially in the central processing unit of the machine by the program as described below; however, it is noted that many of the mathematical operations being performed could by additional complexity be performed in parallel rather than sequentially to enable a much higher control sampling rate than otherwise is attainable with the sequential program.

Figure 12A:
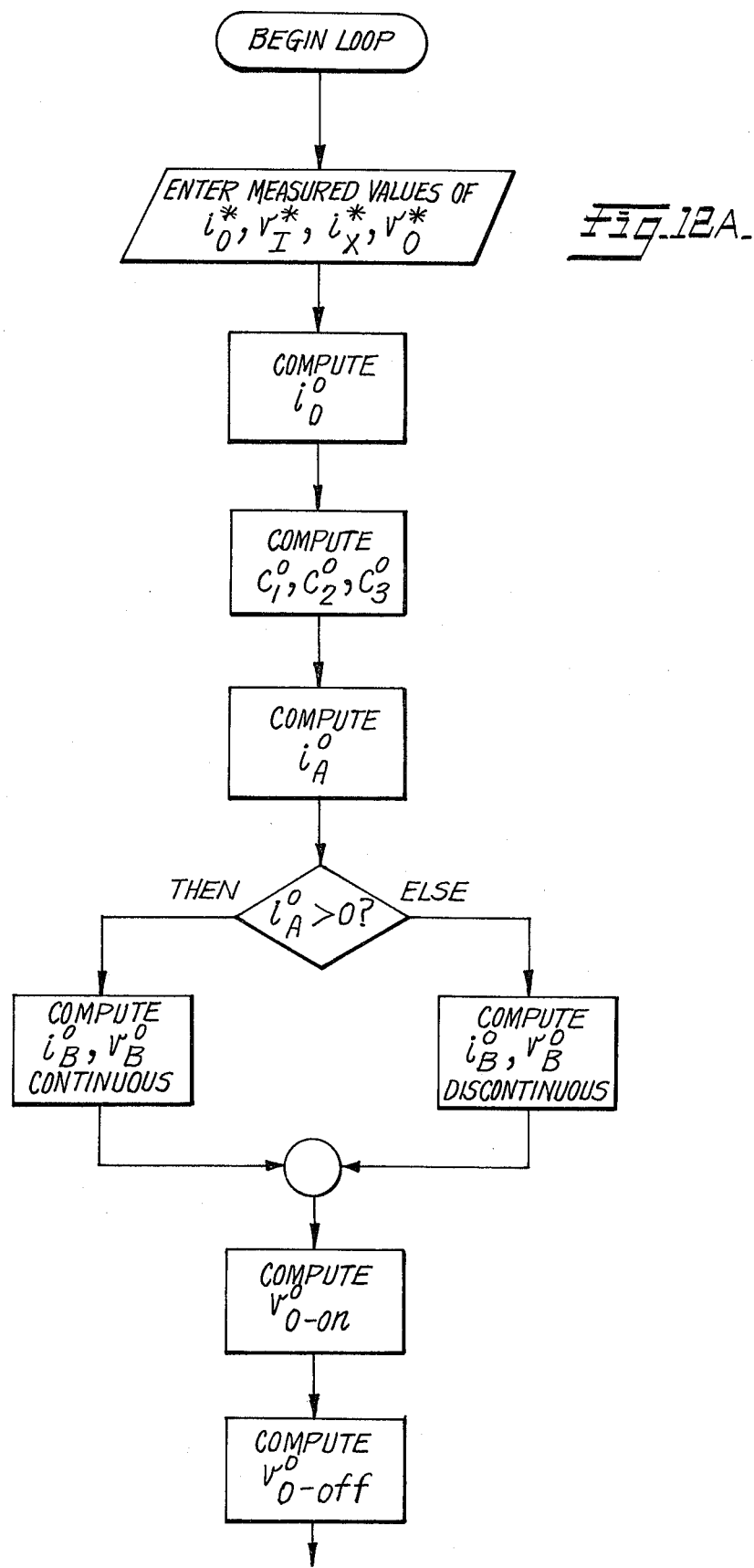

FIGS. 12A, 12B comprise a flow chart for a suitable digital computer controller implementation of the invention. As indicated by the symbols in FIGS. 12A, 12B, un-normalized systems of parameters and variables are used in the program and consequently also are employed throughout the following description in connection with this controller implementation, and also with the analog controller version. Also, two new symbols are introduced with respect to FIGS. 12A, 12B to help in distinguishing between physically measured system variables and the variables and parameters which are computed within the controller. Thus, throughout the following description, measured values of variables from the power delivery system power stage are indicated by a superscript asterisk (*), and computed values generated by the control program are indicated by a superscript circle (°).

The controller depicted in FIGS. 12A, 12B begins by utilizing measured values of the four signals from the power delivery system power stage and which are used in deriving the desired on-off switching control function. Two of these signals, $i_O^*$ and $v_I^*$, represent the externally imposed operating conditions of the system and the other two input signals $i_X^*$ and $v_O^*$, represent the state of the system power stage variables at the instant of sampling. The program then causes the controller to follow the sequence of operation depicted in FIGS. 12A, 12B and to be described more fully hereinafter to determine whether the power switch of the power delivery system should be turned on or off for those measured values of the power stage variables. Prior to reaching the end of the program, the control command is updated to correspond to the most recently sampled values of these variables. After updating, the program is completed and thereafter another set of sampled values is obtained and the process repeated to determine the next sequential control command.

The equations which generate the dynamic on-off switching boundary used in the program are set forth in equations (17) and (18) and are rewritten below as equations (19) and (20) in a form which more clearly illustrates their use in the on-off control of the power delivery system. These equations are derived with respect to the model of the voltage step-up DC to DC power converter shown in FIG. 3A and 3B of the drawings and are expressed in terms of the output voltage $v_O$ rather than the capacitor voltage $v_c$.

$$v^0_{O\text{-off}} = c_1^0(i_X^{*2} - i_B^{02}) + c_2^0(i_X^* - i_B^0) + v_B^0 - i_O^* r_C \quad (19)$$

$$v^0_{O\text{-on}} = c_3^0(i_X^* - i_B^0) + v_B^0 + (i_X^* - i_O^*) r_C \quad (20)$$

where $$c_1^0 = \frac{-L}{2C(V_O - v_I^*)} \quad (21)$$

$$c_2^0 = \frac{i_O^0 L}{C(V_O - v_I^*)} \quad (22)$$

$$c_3^0 = -\frac{i_O^0 L}{v_I^* C} \quad (23)$$

$$i_O^0 = \frac{V_O}{R_O^0} \quad \text{where} \quad R_O^0 = \frac{v_O^*}{i_O^*} \quad (24)$$

$$i_A^0 = \frac{i_O^0 V_O}{v_I^*} - \frac{T v_I^*(V_O - v_I^*)}{2 L V_O} \quad (25)$$

Equation (19) gives the value of the voltage on the switch-off segment of the switching boundary trajectory as a function of the measured reactor current $i_X^*$. Consequently, this computed value of voltage is identified by the symbol $v^0_{O\text{-off}}$ and is illustrated in the system-state plane of $i_X$ versus $v_O$ shown in FIG. 13A, 13B. The value of voltage on the switch-on segment of the switching boundary trajectory is derived from equation (20) as a function of the measured reactor current $i_X^*$ and is repxrented by the symbol $v^0_{O\text{-on}}$. This switching boundary is depicted in FIG. 13A and 13B wherein the value of capacitor equivalent series resistance is negligible for FIG. 13A and is substantial in FIG. 13B. The coefficients used in equations (19) and (20), $c_1^0$, $c_2^0$ and $c_3^0$ are functions of the values of the power delivery system power handling network components L and C, the desired average output voltage $V_O$, the measured value of input voltage $v_I^*$ and the computer value of the desired average output current $i_O^0$ to be described hereinafter. These coefficients are derived pursuant to equations (21), (22) and (23).

As illustrated in FIG. 7, the controller consists of two principle sections, a computational section 11 in which $v^0_{O\text{-off}}$ and $v^0_{O\text{-on}}$ are determined pursuant to equations (19) and (20), and a comparison decision making section 12 in which the measured output voltage $v_O^*$ is compared to these computed values and an on or off switching command is issued and applied to the power switch of the power stage. After receiving a set of sample system input signals, the controller proceeds to process these signals, together with the preprogrammed power stage component values and the specified steady-state operating characteristics including the designer specified timing parameter, to determine the system-state switching boundary. As illustrated in FIG. 12A the first computation performed determines the average output current $i^0_O$ which is commensurate with the desired average output voltage $V_O$ and the externally applied load. This computation is conducted pursuant to equation (24) and is based on the assumption that the power delivery system load is purely resistive and thus can be determined from Ohm's law for the measured values of output current and output voltage. This computed value of current is the value which is used in determining the coordinates of the steady-state switch-off point $i_B^0$, $v_B^0$ (shown in FIG. 13A) and the coefficients of the equations which describe the system switching boundary.

Using the computed value of $i_O^0$ and the measured value of input voltage $v_I^*$, the coefficients $c_1^0$, $c_2^0$, and $c_3^0$ are computed from equations (21), (22) and (23), respectively. These coefficients determine the shape of the system-state switching boundary, but the desired steady-state switch-off point must also be computed to located the particular on-time and off-time trajectories which will yield the desired end result steady-state operating characteristics. The particular power delivery system being used with the controller implementation shown in FIGS. 12A, 12B is designed to operate in a constant frequency mode so that equations (11)–(14) are used to compute the state-plane coordinates of the desired new switch-off point $i_B^o$ and $v_B^o$. As indicated with respect to equations (11)–(14), the equations which determine the coordinates of the steady-state switch-off point are not the same for both continuous and discontinuous conduction modes of operation. Thus, before the desired new steady-state switch-off point can be computed, the controller program must determine in which mode of operation the power delivery system should function under the measured externally applied operating conditions. This can be determined by computing the value of the steady-state switch-on current $i_A^o$ which is given by equation (25). If the computed value of steady-state switch-on current $i_A^o$ is greater than zero, then steady-state operation for the power delivery system under the measured operating conditions then in existence, should be in the continuous conduction mode. If $i_A^o$ is less than or equal to zero, the power delivery system should operate in the discontinuous conduction mode. Thus, depending on the computed value of $i_A^o$, either equations (11) and (12) or equations (13) and (14) are used to compute the values of the coordinates of the steady-state switch-off point $i_B^o$. Having determined the values of the coefficients $c_1^o$, $c_2^o$, and $c_3^o$, and the values of the coordinates of the steady-state switch-off point $i_B^o$ and $v_B^o$, the values for $v^o_{O\text{-}off}$ and $v^o_{O\text{-}on}$ can be computed from equation (19) and (20), respectively. The completion of these computations is the final step required in the computation section of the controller, and with these computed dynamic on-off switching state-plane boundary values and the measured value of the system-state variable, the controller has all of the information it needs to determine whether the power stage switch should be on or off. This point in the computational process is illustrated in FIG. 12B of the drawings by the box labeled Compute $v^o_{O\text{-}off}$.

Figure 13:
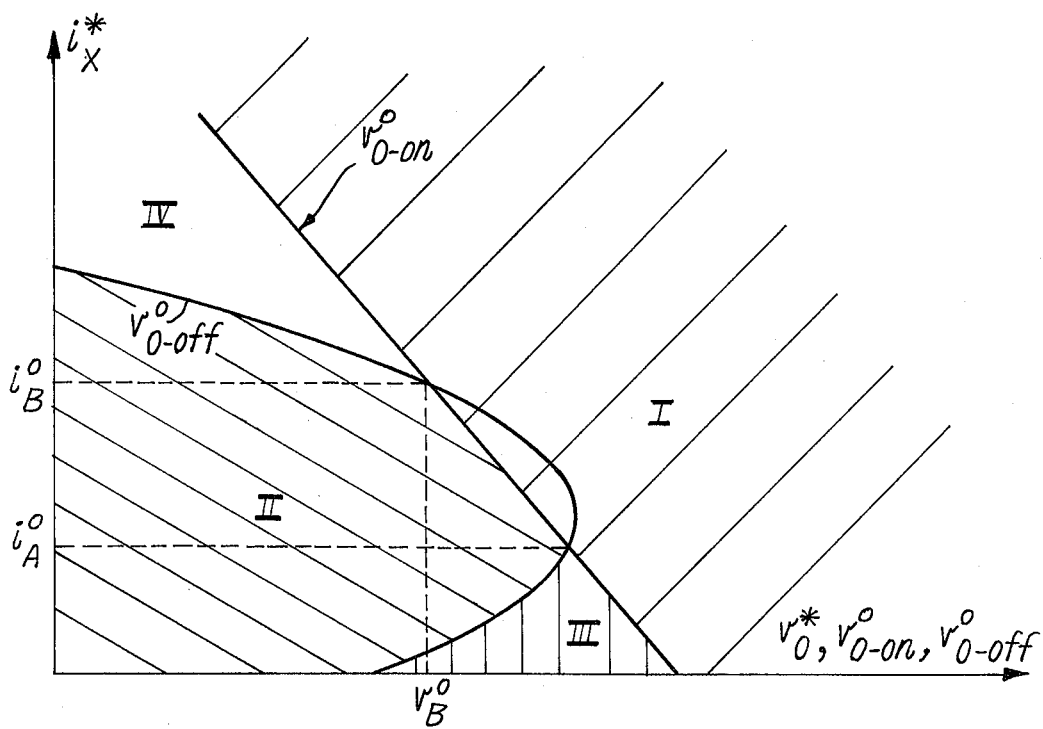
FIGS. 13A and 13B are plots of the computed switching boundaries and resultant on regions (II and III) and off regions (I and IV) of the system-state plane which are sequentially monitored by the controller of the invention and wherein for FIG. 13A the capacitor equivalent series resistance $r_C$ is negligible and in FIG. 13B the value of $r_C$ is substantial.

As depicted in FIG. 12B of the drawings, the first step in the comparative decision section of the controller program is to determine the instantaneous state of the power delivery system power switch Q. If the power switch is off, the measured value of output voltage $v_O^*$ is compared to the computed value of the switch-on line $v^o_{O\text{-}on}$ at the measured value of the reactor current $i_X^*$. From FIG. 13 is will be apparent that if the measured value of output voltage is greater than the computed value $v^o_{O\text{-}on}$ at the measured value of reactor current $i_X^*$, the state of the power delivery system at the sampling instant is to the right of the switch-on line and hence in region I of FIG. 13A, 13B, and thus the power switch should remain off. If the state of the system is to the left of the switch-on boundary $v^o_{O\text{-}on}$, however, its position relative to the switch-off boundary $v^o_{O\text{-}off}$ must be determined. Likewise, if the power delivery system's power switch is found to be on at the beginning of the loop, the position of the system-state relative to the switch-off boundary must be determined. If the computed value of the switch-off voltage $v^o_{O\text{-}off}$ is greater than the measured value of output voltage $v_O^*$, then the state of the system is in region II of FIG. 13A, 13B and the power switch should be on. If $v^o_{O\text{-}off}$ is less than or equal to $v_O^*$, however, the system-state could be in either region III (an on region) or region IV (an off region). Thus, the measured value of reactor current $i_X^*$ must be compared to the value of the steady-state switch-on current $i_A^o$ which was computed earlier pursuant to equation (25) to determine whether the system-state is in region III or IV, and thus whether the power switch should be on or off. This last mentioned comparison is illustrated in FIG. 12B of the drawings by the diamond-shaped box labeled $i_X^* < i_A^o$.

At this point in the controller program processing a control decision has been made based upon the most recent measured values of the state of the power delivery system and its externally imposed operating conditions. However, before the program returns the controller to the beginning of the control loop to start processing the next sequential set of measured input signal values, the value of the measured reactor current $i_X^*$ at that point in the program is compared to a specified maximum value $I_{max}$. If $i_X^*$ exceeds this maximum value of reactor current, a power switch turn-off signal is issued by the controller as illustrated at the bottom of FIG. 12B in order to prevent the reactor current from rising to a level which might damage the power delivery system power handling network components. If $i_X^*$ is less than $I_{max}$, no operation is performed. By this expedient, a simple current limit protection feature is introduced into the operation of the controller.

TABLE 1

| Component or Parameter | Measured or Specified Value |
|---|---|
| L | 9.7 mH |
| C | 12,900 μF |
| $r_C$ | 0.017 Ω |
| $V_O$ | 28.0V |
| T | 10.0 msec |
| $i_O$ | 0.4 – 4.0 A |
| $v_I$ | 16.0 – 24.0 V |

Table 1 lists the component or parameter values of a working power delivery system employing a novel controller constructed in accordance with the invention. In operation, the time required for the controller to perform the boundary defining and comparison operations called for in the control loop shown in FIGS. 12A, 12B from start to finish was approximately 200 microseconds. Thus, in order to be able to compute on-off control signals sufficiently often per cycle of operation of the power delivery system and thereby enable accurate system performance, the power delivery system had to operate at relatively low frequencies. The particular voltage step-up DC to DC power converter shown in FIG. 1 was designed to operate at 100 hertz so that the control loop was enabled to process approximately 50 control cycles of operation for each switching cycle of the power delivery system. The rated average output voltage for the converter of FIG. 1 was 28 volts, the rated output current was 4 amperes and the specified range of input voltage was 16–24 volts. Small current sensing resistors were used to measure the instantaneous values of the reactor current and the output current. In response to stepped changes in load current from 100% to 50% of rated value, the demonstration converter operating under the state-trajectory control law of the controller was able to move from one steady-state condition to the second commanded condition in one on-off switching cycle of control. Under the cited conditions, the decrease in load current occurred in a power switch-off time interval, and the switch remained open until the state of the power delivery system crossed the new switch-on boundary. In making the stepped change, the converter momentarily operated in the discontinuous conduction mode during the transient cycle, but steady-state operation for both load conditions was in the continuous conduction mode. In a second example, the demonstration system was subjected to a stepped change in output current from 100% to 25% of its rated value. The new steady-state condition was again achieved in one on-off switching cycle of control and the system again operated in the discontinuous conduction mode of operation at the lighter load even during steady-state operating conditions. The frequency of operation at the lighter load condition was reduced to approximately 75 hertz rather than the specified 100 hertz as it was at the higher load condition. It has been shown analytically and verified with computer simulation data that this frequency discrepancy is caused by an insufficiently high sampling rate during the power switch on-time intervals. This frequency discrepancy can be eliminated by either increasing the controller sampling rate, or by incorporating additional analytically derived terms in the equations which define the system switching boundary.

Figure 14:
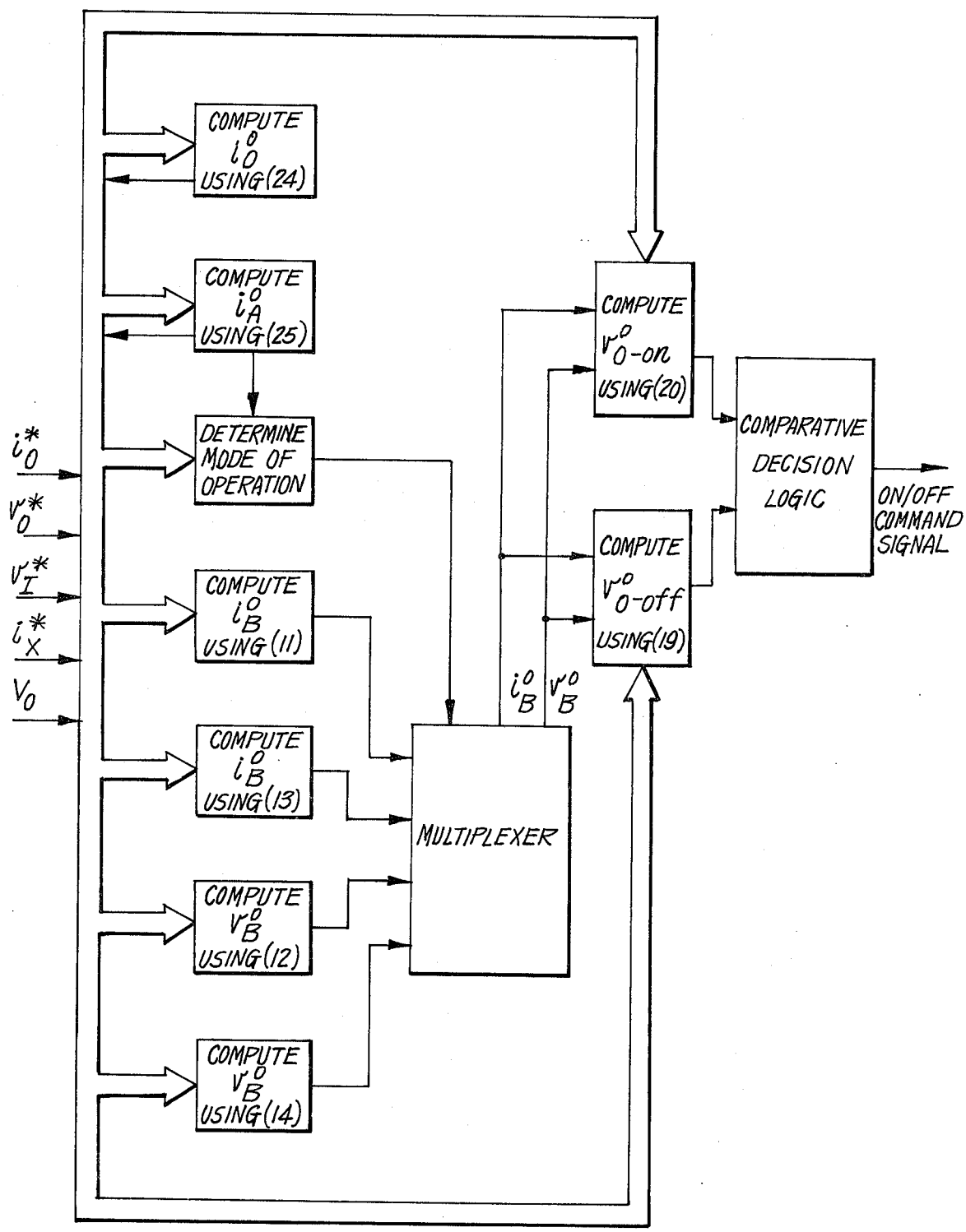
FIG. 14 is a schematic functional block diagram of an analog form of controller suitable for use in practicing the invention.

FIG. 14 presents a conceptual block diagram of an analog controller implementation of the invention. The input measured values of $i_X^*$, $i_O^*$, $v_I^*$ and $v_O^*$, together with the constant desired average output voltage $V_O$ are provided to an analog signal supply bus which in turn supplies the various functional blocks as indicated. The values of the state-plane switching boundary are thus continuously computed in the computational section and compared to the continuously measured state of the system in the comparator stage.

Figure 14A:
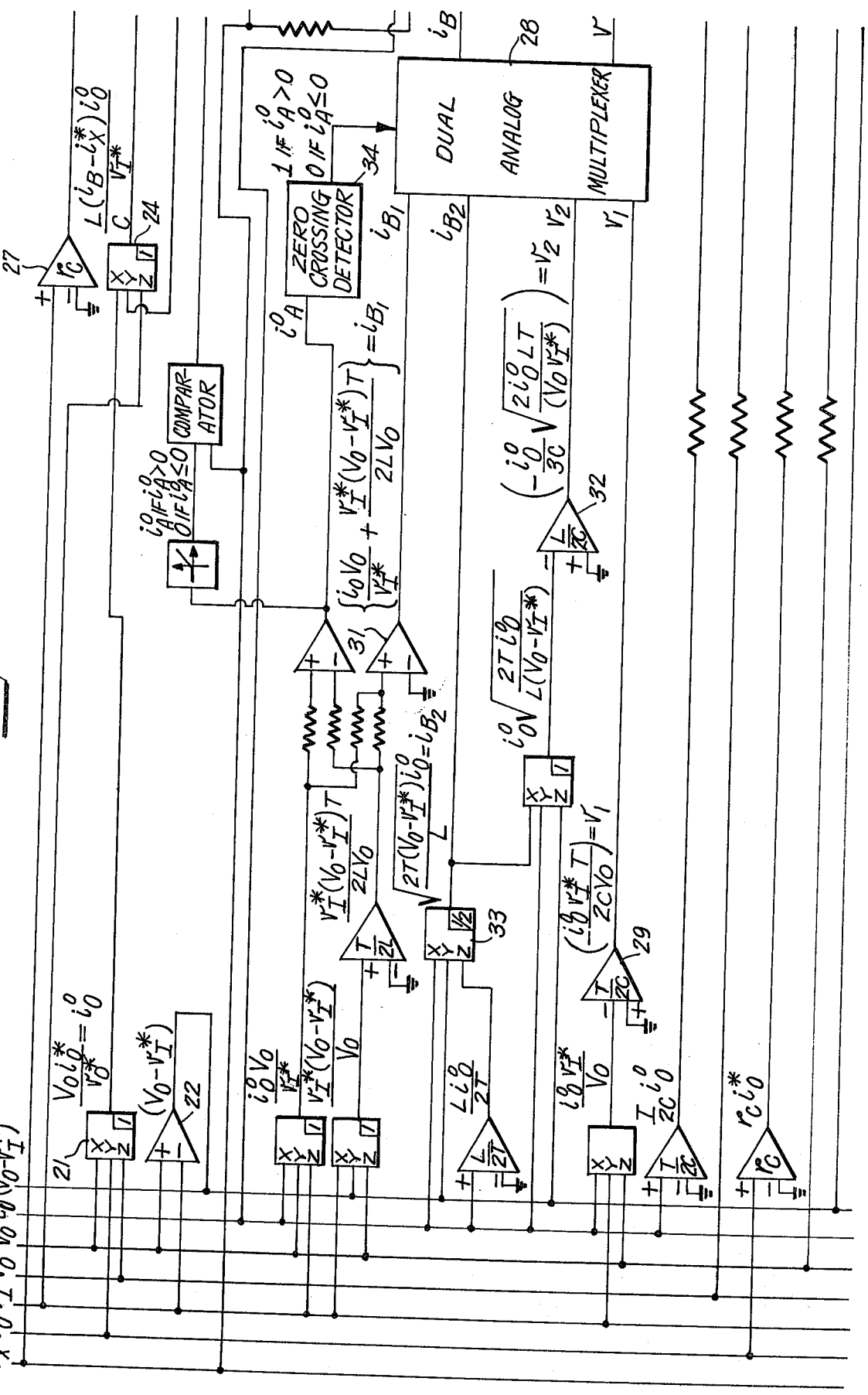
FIGS. 14A and 14B are a more detailed schematic block/circuit diagram of the analog controller shown functionally in FIG. 14.
Figure 14B:
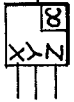

FIGS. 14A and 14B together comprise a schematic circuit diagram of a novel analog controller constructed in accordance with the invention. FIG. 14 depicts functionally the computation sections and the comparison sections of the analog controller. In FIG. 14A, the input measured values of $i_X^*$, $i_O^*$, $v_I^*$ and $v_O^*$ are provided to the analog controller. The controller is comprised of a number of standard, commercially available integrated circuit analog function modules such as that shown at 21 which have the generalized transfer function $E_0 = X(Y/Z)^\alpha$ for appropriately processing input signals applied to its X, Y and Z input terminals pursuant to this transfer function. It is believed apparent that the exponent $\alpha$ can be allowed to equal the value one whereby the component can be tailored to perform simple algebraic functions such as that illustrated for 21 wherein the desired steady-state average output voltage $V_O$ is applied to the X input terminal, the measured value of output current $i_O^*$ applied to the Y input terminal and the measured value of the output voltage $v_O^*$ applied to the Z input terminal to derive the output function $$\frac{V_O i_O^*}{v_O^*} = i_O^o$$

This value of $i_O^o$ is fed back to an input terminal marked with this characteristic signal for use in other portions of the analog controller. In a similar fashion an operational amplifier shown at 22 in FIG. 14A is employed to derive the function $(V_O - v_I^*)$ for application to a terminal line marked with this characteristic function so that it can be used at other different points in the analog controller.

The value $i_O^o$ appearing at the output of component 21 is supplied to the X input terminal of a multiplier component 24. The multiplier component 24 also has supplied to its Z input terminal the measured value of the input voltage $v_I^*$. A separately derived signal representative of the value $(L/C)(i_B^o - i_X^*)$ obtained from the output of an operational amplifier 25 is supplied as the third input terminal to the Y input of multiplier component 24 which operates to derive at its output a signal $$\frac{L(i_B^o - i_X^*) i_O^o}{Cv_I^*} .$$

This signal is applied to one input terminal of an operational amplifier 26 along with the output signal $i_X^* r_C$ obtained from the output of an operational amplifier 27 having the transfer characteristic $r_C$ and whose input is supplied the measured value of the reactor current $i_X^*$. The operational amplifier 26 derives at its output a portion of the switch-on boundary equation $$V_{on}^o = \frac{L i_{Oo}}{Cv_I^*}(i_B^o - i_X^*) + i_X^* r_C . \tag{26}$$

The common terms $v_B^o$ and $i_O^* r_C$ as found in equations (19) and (20) are incorporated into these computations and thus the symbols $v_{off}^o$ and $v_{on}^o$ are used in equations (26) and (27) respectively rather than $v_{O-off}^o$ and $v_{O-on}^o$ as are used in equations (19) and (20) respectively.

In a manner similar to that above, the processing of the measured input signals and the two computed values $i_O^o$ and $(V_O - v_I^*)$ can be traced through the other separate and parallel signal processing paths to derive a portion of the switch-off boundary equation $$v_{off}^o = \frac{L(i_B^{o2} - i_X^{*2})}{2C(V_O - v_I^*)} - \frac{Li_O^o(i_B^o - i_X^*)}{C(V_O - v_I^*)} . \tag{27}$$

In addition to the computed $v_{on}^o$ and the $v_{off}^o$ values, the controller of FIG. 14A and 14B derives a computed value of comparison voltage $$v_X^o = v^o + \frac{i_O^o T}{2C} + v_O^* + r_C i_O^* - V_O \tag{28}$$

in which the terms $v_B^o$ and $i_O^* r_C$ are included. Note that $$v_B^o = V_O - v^o - \frac{i_O^o T}{2C}$$

In obtaining the values of $v_X^o$ and $v_{off}^o$, different values of $v^o$ and $i_B^o$ are used depending upon whether the power delivery system should be in the continuous conduction mode or the discontinuous conduction mode. For this purpose a dual analog multiplexer shown at 28 selects the outputs supplied from an operational amplifier 29 and an operational amplifier 31 for supplying the $v^o$ and the $i_B^o$ values, respectively, if the power converter system should be operating in the continuous conduction mode. Alternately, if the power delivery system should be operating in the discontinuous conduction mode, the multiplexer 28 supplies the outputs from the operational amplifier 32 and multiplier component 33 for use as the $v^o$ and $i_B^o$ values, respectively. To determine whether the power delivery system should be operating in the continuous conduction or the discontinuous conduction mode, a zero crossing detector 34 is employed to which a computed value of steady-state switch-on current $i_A^o$ is applied, and which makes the determination one if $i_A^o > 0$ and zero if $i_A^o \leq 0$ for controlling operation of the dual analog multiplexer 28. The respective values of $v^o$ and $i_B^o$ are supplied as inputs to a summing amplifier 35 and to the operational amplifier 25, respectively. The summing amplifier 35 also has supplied to its input signals representative of the value $$\frac{i_o^o T}{2C},$$

$r_C i_o^*$, $v_o^*$ and $V_O$ and derives at its output the computed value $+v_X^o$. The operational amplifier 25, as mentioned previously, supplies its output to the multiplier component 24 and also to a multiplier component 36 from whose output the portion of the switch-off boundary signal $v_{off}^o$ is derived. The three computed signals $v_{on}^o$, $v_{off}^o$ and $v_X^o$ are then compared in a comparator circuit and AND logic circuit to derive at the output of an OR gate an output controller switch-on or switch-off signal.

The different values of voltage $v^o$ and turn-off current $i_B^o$ for both the continuous conduction mode and the discontinuous conduction mode are given by the following expressions:

FOR CONTINUOUS CONDUCTION MODE $$v^o = -\frac{i_o^o v_1^{o2} T}{2CV_O} \tag{29}$$

$$i_B^o = \frac{i_o^o V_O}{v_1^o} + \frac{v_1^o(V_O - v_1^o)T}{2LV_O} \tag{30}$$

FOR DISCONTINUOUS CONDUCTION MODE $$v^o = -\frac{i_o^o}{3C}\sqrt{\frac{2 i_o^o L T}{(V_O - v_1^o)}} \tag{31}$$

$$i_B^o = \sqrt{\frac{2T(V_O - v_1^o) i_o^o}{L}} \tag{32}$$

Figure 15:
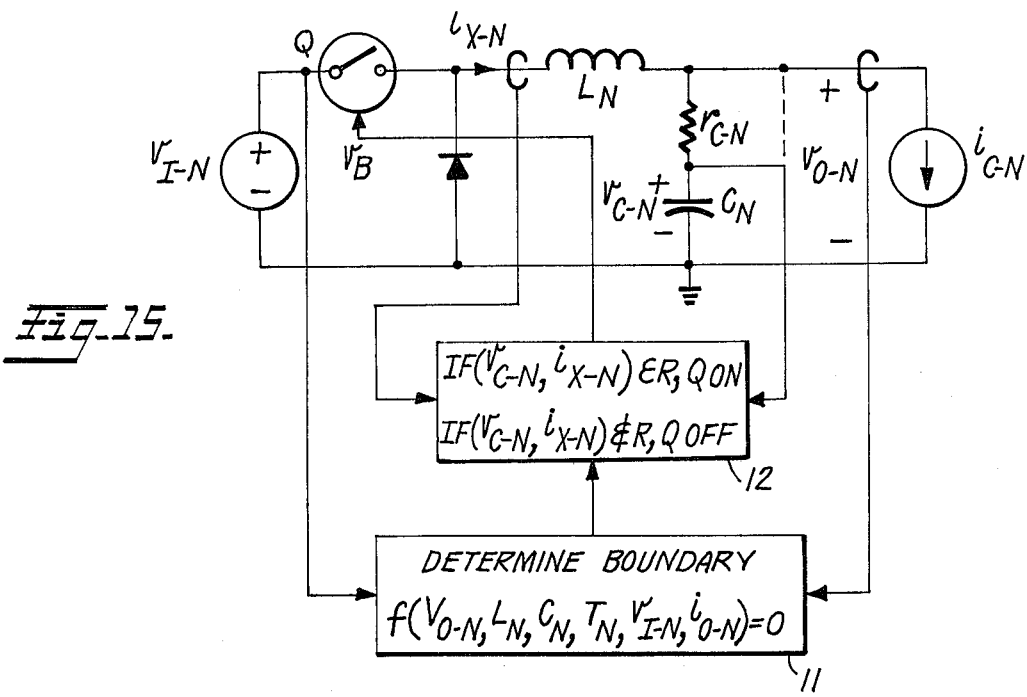
FIG. 15 is a simplified and normalized schematic circuit diagram of a current step-up DC to DC power converter employing a state-trajectory free running controller according to the invention.

FIG. 15 is a schematic functional block diagram of a current step-up DC to DC power converter incorporating a controller constructed according to the invention wherein the regulated increase in output current is obtained from an unregulated direct current source of energy operating at a lower current value than the output current value. The expressions defining the families of on-time trajectories and off-time trajectories for the current step-up power converter shown in FIG. 15 are set forth below. The derivation of the equations for these trajectories is entirely similar to that for the voltage step-up configuration discussed above and is set forth in detail in the above referenced doctoral thesis published by the Duke University School of Engineering. The plots for these equations are shown generally in FIG. 16 and can be seen to be parabolas during both the power switch on-time interval and the power switch off-time interval when the reactor current is greater than zero.

During the power switch on-time interval $T_{on-N}$ $$v_{C-N} = -\frac{L_N}{2C_N(V_{O-N} - v_{I-N})} i_{X-N}^2 + \tag{33}$$

$$\frac{i_{O-N}L_N}{C_N(V_{O-N} - v_{I-N})} X - N + K_1$$

During $T'_{off-N}$ $$v_{C-N} = -\frac{L_N}{2C_N V_{O-N}} i_{X-N}^2 + \frac{i_{O-N}L_N}{C_N V_{O-N}} i_{X-N} + K_2 \tag{34}$$

During $T''_{off-N}$ $$i_{X-N} = 0 \tag{35}$$

with $$K_1 = \frac{L_N}{2C_N(V_{O-N} - v_{I-N})} i_{A-N}^2 - \tag{36}$$

$$\frac{i_{O-N}L_N}{C_N(V_{O-N} - v_{I-N})} i_{A-N} + v_{A-N}$$

$$K_2 = \frac{L_N}{2C_N V_{O-N}} i_{B-N}^2 - \frac{i_{O-N}L_N}{C_N V_{O-N}} i_{B-N} + v_{B-N} \tag{37}$$

The equations for locating the coordinates of the desired new steady-state switch-off point for constant frequency operation of the current step-up converter shown in FIG. 15 under new externally applied operating conditions are set forth in equations (38) and (39) for the continuous conduction mode of operation and in equations (40) and (41) for the discontinuous conduction mode.

CONTINUOUS CONDITION OPERATION $$i_{B-N} = i_{O-N} + \frac{V_{O-N}(v_{I-N} - V_{O-N})T_N}{2L_N v_{I-N}} \tag{38}$$

$$v_{B-N} = \tag{39}$$

$$V_{O-N} + \frac{(v_{I-N} - 2V_{O-N})(v_{I-N} - V_{O-N})V_{O-N}T_N^2}{12L_N C_N v_{I-N}^2}$$

DISCONTINUOUS CONDUCTION OPERATION $$i_{B-N} = \sqrt{\frac{2T_N i_{O-N}(v_{I-N} - V_{O-N})V_{O-N}}{L_N v_{I-N}}} \tag{40}$$

$$v_{B-N} = V_{O-N} + \tag{41}$$

$$\frac{(v_{I-N} - 2V_{O-N})}{3C_N}\sqrt{\frac{2i_{O-N}L_N T_N}{v_{I-N}V_{O-N}(v_{I-N} - V_{O-N})}} -$$

$$\frac{T_N i_{O-N}(v_{I-N} - 2V_{O-N})}{2C_N v_{I-N}}$$

Figure 16:
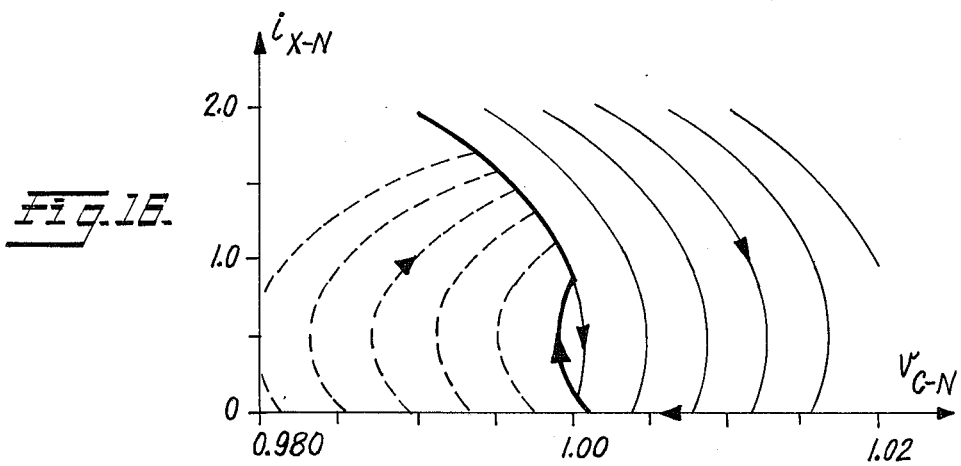
FIG. 16 is a plot in the state-plane of the state trajectories and switching boundary (bold line) for the current step-up DC to DC converter of FIG. 15 and its controller.
Figure 11A:
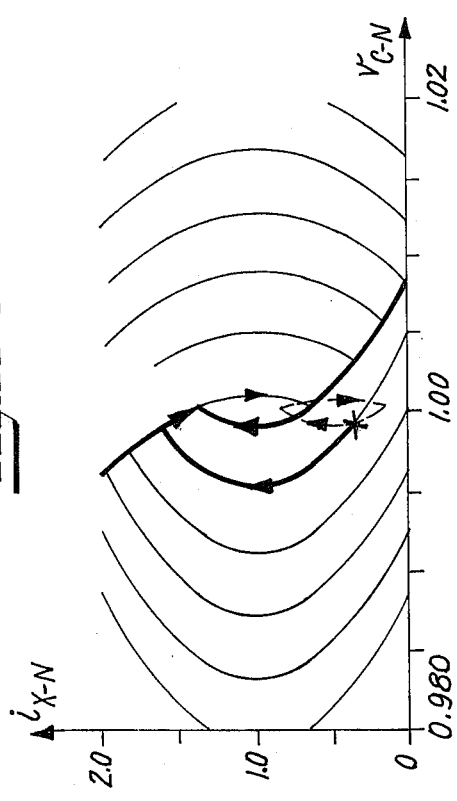
Figure 11B:
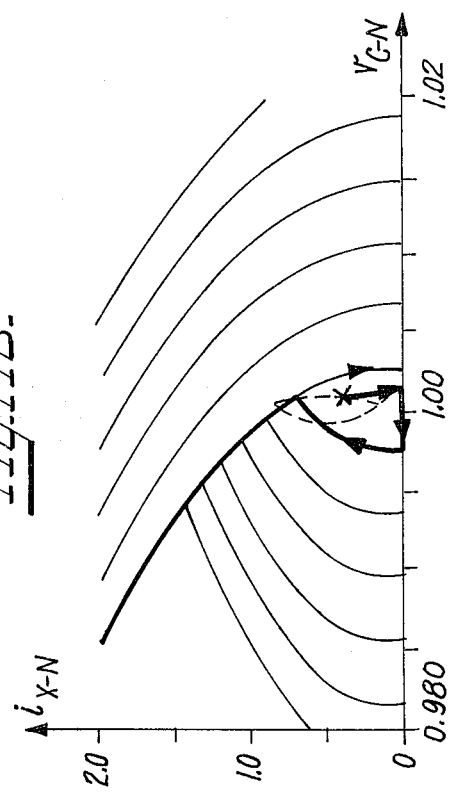

Having determined the steady-state switch-off point, the state-plane switching boundary is established by selecting the system off-time and on-time trajectories which pass through that point. Such state-plane switching boundary on-time and off-time trajectory segments are shown in FIG. 16 in bold lines. Again as with the voltage step-up converter, the instantaneous values of input voltage and output current are used, in conjunction with the power stage component values, the designer-specified timing parameter and the desired average output voltage to construct the two-segment state-plane switching boundary represented by the expression $f(V_{O-N}, L_N, C_N, T_N, v_{I-N}, i_{O-N}) = 0$ where the function $f$ is given by the following equations (42) and (43) for the switching boundary in the $i_{X-N}$ versus $v_{C-N}$ plane and the modified values $f$ are presented in equations (44) and (45) where the controller is designed to employ measured output voltage values in place of the capacitor voltage values.

$$f = -\frac{L_N}{2C_N V_{O-N}}(i_{X-N}^2 - i_{B-N}^2) + \frac{i_{O-N}L_N}{C_N V_{O-N}}(i_{X-N} - i_{B-N}) + \tag{42}$$

-continued $$f = -\frac{L_N}{2C_N(V_{O-N} - v_{I-N})} (i_{X-N}^2 - i_{B-N}^2) + \tag{43}$$

$$\frac{i_{O-N}L_N}{C_N(V_{O-N} - v_{I-N})} (i_{X-N} - i_{B-N}) + v_{B-N} - 0 \cdot v_{C-N}$$

$$v_{B-N} - v_{C-N} \text{ for } i_{X-N} \geq i_{B-N}$$

for $i_{X-N} < i_{B-N}$ $$f = -\frac{L_N}{2C_N V_{O-N}} (i_{X-N}^2 - i_{B-N}^2) + \tag{44}$$

$$\frac{i_{O-N}L_N}{C_N V_{O-N}} (i_{X-N} - i_{B-N}) + v_{B-N} - v_{O-N} +$$

$$(i_{X-N} - i_{O-N}) r_{C-N} \text{ for } i_{X-N} > i_{A-N}$$

$$f = -\frac{L_N}{2C_N(V_{O-N} - v_{I-N})} (i_{X-N}^2 - i_{B-N}^2) + \tag{45}$$

$$\frac{i_{O-N}L_N}{C_N(V_{O-N} - v_{I-N})} (i_{X-N} - i_{B-N}) + v_{B-N} - v_{O-N} +$$

$$(i_{X-N} - i_{O-N}) R_{C-N} \text{ for } i_{X-N} \leq i_{A-N}$$

It should be noted that the same four system signals are utilized in both the voltage step-up converter configuration control and the current step-up converter configuration control although the resultant on-off switching boundary trajectory segments and the region R for the respective power circuit configurations are different. FIG. 16 illustrates the on-off switching boundary trajectory segment (bold lines) for the current step-up converter of FIG. 15 having a $v_{I-N} = 1.5$ and $i_{O-N} = 0.5$. FIG. 17A illustrates the transient response of the free-running current step-up converter system of FIG. 15 to step changes in output current from $i_{O-N} = 0.5$ to 1.0. FIG. 17B of the drawings shows the transient response of the system to a step change in output current from $i_{O-N} = 0.5$ to 0.1. The dashed closed curves in each of these figures represent the original steady-state trajectory corresponding to the externally applied conditions shown in FIG. 16.

Figure 18:
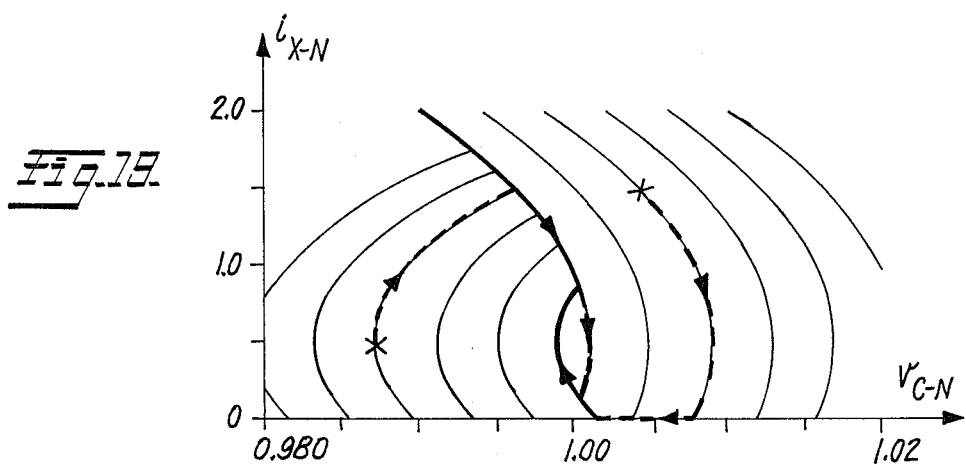
FIGS. 18A and 18B are plots in the state-plane of the transient response of the system of FIG. 15 to step changes in input voltage $v_{I-N}$ from 1.5 to 1.25 and from 1.5 to 2.0, respectively, and wherein the dashed closed curves represent the original steady-state trajectory for $V_{I-N} = 1.5$ and $i_{O-N} = 0.5$.
Figure 18A:
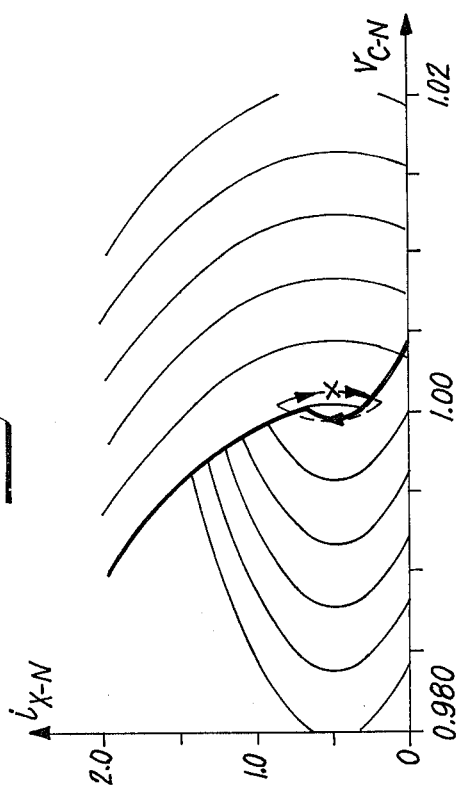
Figure 18B:
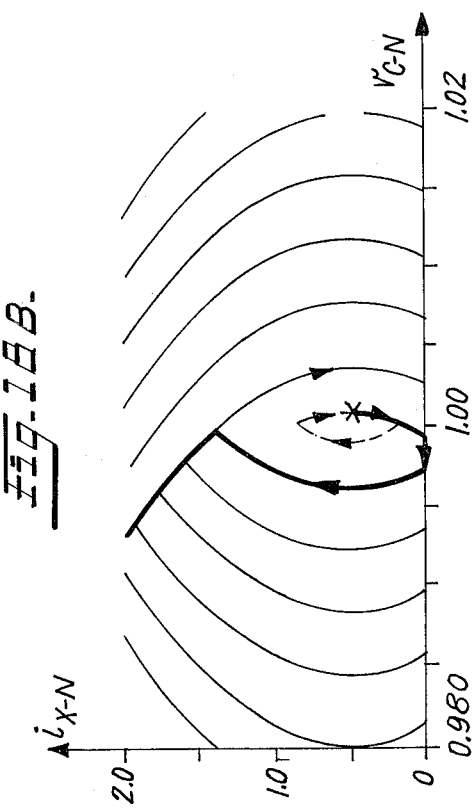

FIG. 18A illustrates the transient response of the free-running current step-up converter of FIG. 15 to a step change in input voltage $v_{I-N}$ from 1.5 to 1.25. FIG. 18B shows the response of the system to a step change in input voltage from 1.5 to 2.0 where again the dashed closed curves represent the original steady-state trajectory corresponding to the operating conditions depicted in FIG. 16. FIG. 18B is of particular interest in that it illustrates a change in operating conditions whereby the new steady-state trajectory completely encompasses the original trajectory and so the system transient trajectory results in no voltage or current overshoot or undershoot and the system reaches the new steady-state operating condition in a single on-off switching cycle. Another point of interest revealed in FIGS. 18A and 18B is that the off-time trajectory segments of the current step-up converter configuration do not change shape for changes in input voltage. This characteristic is clearly illustrated in FIGS. 18A and 18B where for the cases in which the change in voltage occurs during an interval when the power switch is off, no apparent change in converter trajectory occurs until the original or the new switching boundary is crossed.

FIG. 19 is a graph illustrating the switching boundary for the current step-up converter of FIG. 15 and illustrates the transient response of the system controller for two different assumed initial operating states indicated by the x marks. The transient trajectory which begins in the off region of the state-plane in this figure incorporates a portion of the $v_{C-N}$ axis as part of its off-time trajectory. The abrupt change in direction which the system-state undergoes at the instant that the reactor current $i_{X-N}$ falls to zero is caused by the diode in the converter power stage becoming reverse biased rather than by any switching signal from the system controller. Since there are no timing restrictions imposed on the converter power switch during these transient trajectories from one steady-state operating point on the state-plane to a new, different steady-state operating point, the switch can remain open or closed for as long a period as is needed for the system-state to reach the new system switching boundary. Any switching prior to the intersection of the system-state with this boundary, whether it be caused by a controller timing constraint or a fixed reference level, etc., which was chosen to accommodate some other operating requirement, can only cause delays in the accomplishment of the desired new steady-state condition and, in some cases, could cause the state of the system to converge to some other undesired equilibrium or unstable condition. Again, it can be observed that no matter how far the initial state of the system is from the new desired equilibrium condition, the direction of the movement of the system-state on the state-plane is always toward the new switching boundary rather than away from it, and thus power delivery systems operating with the new control law are inherently stable in operation.

The implementation of the controller sections 11 and 12 for the system of FIG. 15 employs either a special purpose digital computer or especially programmed general purpose digital computer having characteristics similar to that illustrated in the flow chart of FIGS. 12A, 12B and of course modified to accommodate the changed physical nature of the current step-up power converter configuration pursuant to the equations characteristic of the configuration. Alternatively, a special purpose analog computer similar to that shown in FIGS. 14, 14A and 14B can be designed to operate as the controller section of the system of FIG. 15 but again would be modified to incorporate the characteristic equations of the current step-up converter configuration. In like manner, a special purpose hybrid computational circuit composed of digital and analog functions can be designed to function as the controller section of the system of FIG. 15. The corresponding equations for defining the $v_{O\text{-}on}^o$ and $v_{O\text{-}off}^o$ switching boundary segments of a controller designed for use with the system of FIG. 15 in conjunction with a digitally operated computation section would be in accordance with the following equations (46) – (51) whose equivalence and substitution for the expressions employed in the flow chart of FIGS. 12A, 12B is believed obvious to one skilled in the art.

$$v_{O\text{-}off}^o = c_1^o(i_X^{*2} - i_B^{*2}) + c_2^o(i_X^* - i_B^*) + (i_X^* - i_O^*)r_C + v_B^* \tag{46}$$

$$v_{O\text{-}on}^o = c_3^o(i_X^{*2} - i_B^{*2}) + c_4^o(i_X^* - i_B^*) + v_B^* + (i_X^* - i_O^*)r_C \tag{47}$$

wherein:

$$c_1^o = -\frac{L}{2CV_O} \tag{48}$$

$$c_2^o = \frac{i_oL}{CV_O} \tag{49}$$

$$c_3^o = -\frac{L}{2C(V_O - v_I^*)} \tag{50}$$

-continued $$c_4^o = \frac{i_o^2 L}{c(V_O - v_1^o)} \quad (51)$$

Figure 20:
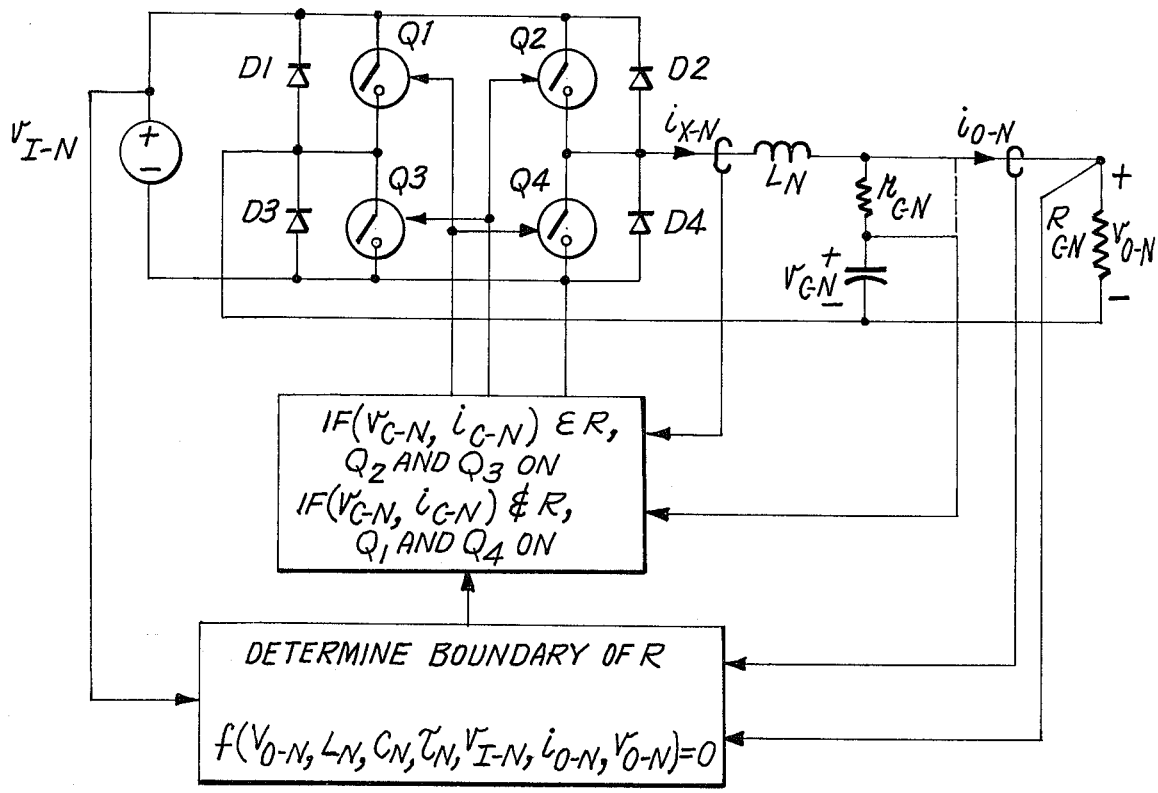
FIG. 20 is a schematic circuit and functional block diagram of a DC to AC power delivery system employing a novel controller according to the invention.
Figure 21:
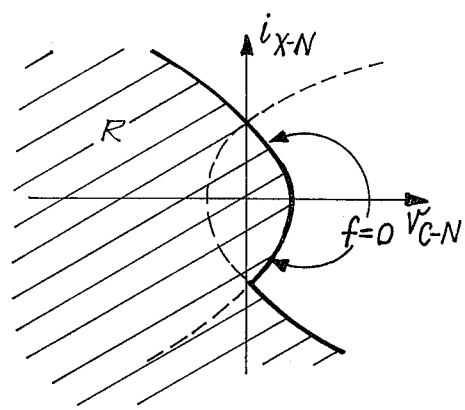
FIG. 21 is a plot in the state-plane of the system-state variables defining the function I and the region R for the power delivery system and controller of FIG. 20.
Figure 22:
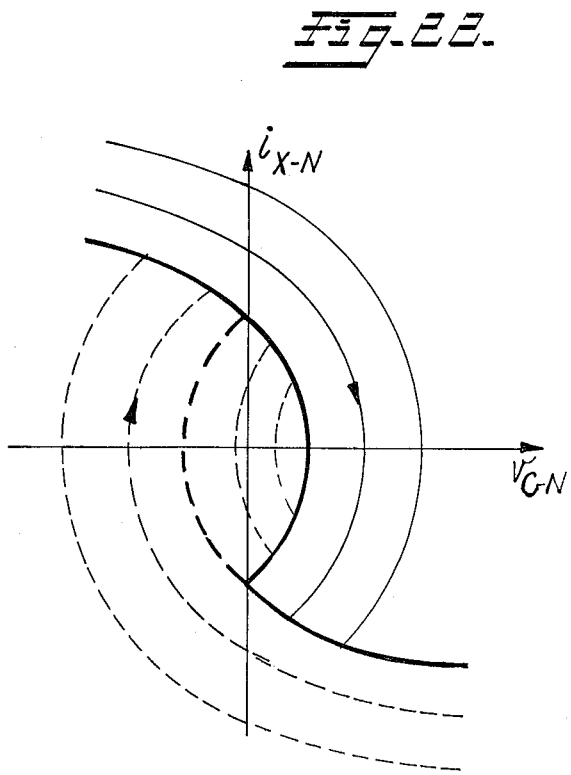
FIG. 22 is a plot in the system state-plane of the state trajectories and switching boundary (bold line) for the system of FIG. 20.

The preceeding discussion illustrates in some detail embodiments of the invention in power converters of the DC to DC type. It is apparent that the same technique of control can be applied in the case of power delivery systems of the DC to AC type. This is illustrated in FIG. 20 which comprises a DC to AC inverter power delivery system employing four power switches connected in a bridge configuration and providing a load consisting of inductor $L_N$, capacitor $C_N$, and output load resistor $R_{L-N}$. The switches in the bridge connected power stage are turned on and off in pairs such that Q1 and Q4 switch on and off as a pair and Q2 and Q3 switch on and off as a unit. No more than two power switches are on at the same time although, in the discontinuous mode of operation when the current through inductor $L_N$ is zero, all four power switches may be off simultaneously. The four diodes D1-D4 are commutating diodes which provide, when necessary, a path for reactive components of current when the power switches open. Since the basic concept of control is the same as that previously discussed, the method of deriving the state-plane trajectories is similar to the procedure for establishing the switching-line boundary for the region R which separates the state-plane into the region R where power-stage switches Q2 and Q3 are on and the remaining region of the state plane where Q1 and Q4 are on is likewise similar. Care has been taken to use the same symbols for all three illustrative examples of power delivery systems controlled according to the invention. The sketch of the state-plane in FIG. 21, which is analogous to FIG. 16 for the current step-up DC to DC converter, shows in bold solid lines the on-off switching boundary. Trajectories in the region R where Q2 and Q3 are on are shown in FIG. 22 as dashed lines, and trajectories in the region where Q1 and Q4 are on are shown as solid lines. The steady-state periodic output condition of the inverter is shown as the closed curve encompassing the origin made of a bold solid line portion that closely coincides with a portion of the switching boundary and a bold dashed line portion. A principal difference between the steady-state operating condition of this power delivery system and the systems previously described is the location of the closed limit cycle trajectory. In the case of a DC to AC inverter type of power delivery system, the steady-state closed-curve trajectory is usually located symmetrically with respect to the origin in the state-plane while in the case of DC to DC converters the steady-state closed-curve trajectory is usually not so located.

From the foregoing description, it will be appreciated that the invention provides a novel method and apparatus for determining a precise switching sequence for the power switching elements of electric power delivery systems of the controlled on-off switching type and which enables extremely fast transient response, precise regulation and highly stable operation. The novel system and control utilizes the values of the power delivery system power handling network components, designer specified operating characteristics, and the externally imposed operating conditions to determine where steady-state operations should be in order to yield desired output characteristics for the given system specifications. The actual state of the power delivery system power handling network components is continuously monitored and compared to this desired equilibrium condition, and from the information obtained from this comparison, the system state is moved to the desired equilibrium condition in one on-off switching cycle of control. Since the controller continuously monitors the power delivery system externally imposed operating conditions, a change in the externally imposed operating condition is immediately sensed and a new equilibrium condition is determined and achieved again in a single cycle of switching control.

Having described several embodiments of a novel system-state and operating condition sensitive control method and apparatus for electric power delivery systems constructed in accordance with the invention, it is believed obvious that other modifications and variations of the invention will be suggested to those skilled in the art in the light of the above teachings. For example, it is believed obvious that the concept of control described herein can be readily adopted to regulate some other operating parameter such as output current in contrast to regulation of the output voltage which has been specifically described in the specification with respect to three different species of power delivery systems. The same concepts apply when the system being controlled employs more than one power switching element which operates in some sequence. Further, energy transfer systems employing a plurality of different reactive components can be controlled according to the invention where, for example, the system has more than one winding that receives energy from the source and a separate winding that delivers magnetically stored energy to the output capacitor and the load. Alternatively, the power delivery system could have more than one output load which may be at different voltage and/or current levels; or systems employing windings with taps to assist in the transformation between input and output voltage levels and/or input and output current levels can be controlled according to the invention. It is therefore to be understood that changes may be made in the particular embodiments of the invention described which are within the full intended scope of the invention as defined by the appended claims.

What is claimed is:

1. A new and improved controllable on-off switching type of power delivery system for transferring electrical power from an input source of electrical energy to a load in a controlled manner, the improvement comprising a novel controller for optimizing the on-off period of operation of said on-off switching type power delivery system to thereby provide extremely fast transient response to changed operating conditions imposed on the system, precise regulation and highly stable operation; said controller including in combination:

operating condition sensing means for sensing the operating conditions externally imposed on the power delivery system;

system state variables sensing means for sensing the actual state of selected power handling network components comprising the power delivery system;

fast responding boundary computation circuit means responsive to said operating condition sensing means and supplied with the component values of the selected power handling network components, a desired output operating characteristic for the system and a designer specified timing parameter for deriving dynamic state-space boundary values defining a desired new area of steady state operation and distinct new areas of on-off operation in the operating state-space for the power delivery system under different new externally imposed operating conditons; and comparison circuit means responsive to said boundary computation circuit means and said system-state sensing means for comparing the values of the system-state variables to the dynamic state-space switching boundary values and deriving respective on-off controlling output signals for controlling the on-off condition of the power delivery system in response to the location of the state of the system variables in the system state-space relative to the switching boundary values.

2. An improved power delivery system according to claim 1 wherein the system state-space for the on-off power delivery system is characterized by families of distinct different switch-on (on-time) and switch-off (off-time) trajectories on the system state-space for a given power delivery system and set of imposed operating conditions and with respect to which there is a unique set of dynamic boundary values identified by the system parameters and desired output characteristics, and wherein said novel controller during each switching cycle causes said power delivery system to remain in a selected on-off condition in response to the on-off controlling output signal from said comparison circuit means while the power delivery system state traverses along a selected on-time/off-time trajectory dependent upon the initial operating state of the system-state variables until intercepting the dynamic state-space boundary characteristic of the instantaneous imposed operating conditions and to switch over to the opposite on-off condition and to remain in the switched over condition while the system-state traverses along the uniquely selected companion on-time/off-time trajectory identified by the interception of the first mentioned trajectory with the dynamic state-space switching boundary until reaching a desired new steady-state operating condition whereby the system can be transiently changed from an initial operating steady-state condition to a different operating steady-state condition in response to newly imposed operating conditions in a precise, single-cycle on-off switching sequence.

3. An improved power delivery system according to claim 2 wherein the shapes of the system state-space on-off trajectories for the power delivery system are known functions of the selected power handling network component values such as the system inductance, capacitance and semiconductor characteristics, and of the externally imposed operating conditions such as the input voltage and output current whereby a change in any one of these parameters causes the shapes of the on-off trajectories to change dynamically along with the change in the dynamic state-space switching boundary values resulting from the change in any of these parameters.

4. An improved power delivery system according to claim 1 wherein the power handling network of the system includes inductive reactive components and the system-state variables sensing means senses the inductive reactor currents and the output voltage of the system and supplies the sensed values to the comparison circuit means of the controller.

5. An improved power delivery system according to claim 1 wherein the power handling network of the system includes both inductive reactive components and capacitive reactive components and the system-state variables sensing means senses both the inductive reactor currents and the voltages across the capacitive reactive components and supplies the sensed values to the comparison circuit means of the controller.

6. An improved power delivery system according to claim 2 wherein the designer specified timing parameter can be proportioned such that the controller while operating the power system in a free running manner, under steady-state conditions switches the power switch of the system on and off at either a constant frequency, a frequency functionally related to the system operating conditions or parameters, with constant off-time or with constant on-time and under each of these different operating manners the system can be made to operate either in a continuous reactor mmf mode or a discontinuous reactor mmf mode depending upon the specified output operating characteristics and the system parameters.

7. An improved power delivery system according to claim 1 wherein the power handling network of the system includes capacitive reactive components and the system-state variables sensing means senses the capacitive reactive voltages and the output voltage of the system and supplies the sensed values to the comparison means of the controller.

8. An improved power delivery system according to claim 3 wherein the power delivery system comprises a voltage step-up DC to DC converter whose dynamic state-plane switching boundary defining the switch-off states of the system is given by the expression:

$$V^o_{O-off} = c_1^o(i_X^{*2} - i_B^{o2}) + c_2^o(i_X^* - i_B^o) + v_B^o - i_O^* r_C \quad (1)$$

the dynamic state-plane switching boundary value line of the system defining the switch-on states is given by:

$$v^o_{O-on} = c_3^o(i_X^* - i_B^o) + v_B^o + (i_X^* - i_O^*) r_C \quad (2)$$

where $$c_1^o = -\frac{L}{2C(V_O - v_f^o)} \quad (3)$$

$$c_2^o = \frac{i_O^o L}{C(V_O - v_f^o)} \quad (4)$$

$$c_3^o = -\frac{i_O^o L}{v_f^o C} \quad (5)$$

and $i_X^*$ is the measured value of the power network reactor current, $i_B^o$ is the computed value of the reactor current at the desired new steady-state switch-off point, $v_B^o$ is the computed value of the capacitor voltage at the desired new steady-state switch-off point, $i_O^*$ is the measured value of the output current, $r_C$ is the value of the equivalent series resistance of the capacitive reactive component in the power handling newwork, L is the value of inductance of the inductive reactive component in the power handling network, C is the value of capacitance of the capacitive reactive component of the power handling network, $V_O$ is the desired average output voltage for the system while operating under steady-state at newly imposed externally applied operating conditions, $i_O^o$ is the computed value of the average output current which is commensurate with the desired average output voltage at the new steady-state operating conditions and $v_I^*$ is the measured value of the input voltage to the power delivery system.

9. An improved power delivery system according to claim 8 wherein said fast boundary computation circuit means comprises digital computation circuit means for deriving a computed value of average output current $i_O^o$ from the desired average output voltage value $V_O$ and a computed load value derived from the measured output voltage and measured output current, means for computing a plurality of coefficients from the computed value of average output current, the desired average output voltage and the system parameters, means employing the computed plurality of coefficients to compute the on-time and off-time computed switching boundary value $v^o_{O-on}$ and $v^o_{O-off}$ respectively, and means for deriving a computed desired value of steady state switch-on current $i_A^o$ upon the power delivery system obtaining steady state operation.

10. An improved power delivery system according to claim 9 wherein the comparison circuit means comprises means for comparing the measured value of the output voltage $v_O^*$ to the computed value of the switch-on dynamic switching boundary line $v^o_{O-on}$ at the measured value of the reactor current $i_X^*$, means for comparing the computed value of the dynamic switching boundary switch-off line $v^o_{O-off}$ to the measured value of the output voltage $v_O^*$, means for comparing the measured value of the reactor current $i_X^*$ to the computed value of the steady state switch-on current $i_A^o$ and deriving controlling on-off switching signals for controlling operation of the power delivery system in accordance with the result of the comparative values.

11. An improved power delivery system according to claim 10 further including means for comparing the measured value of the reactor current $i_X^*$ to a predetermined maximum value of reactor current $I_{max}$ and overriding any controlling output signal in the event that the measured reactor current exceeds the predetermined maximum current limits to maintain the power delivery system in a turned-off state.

12. An improved power delivery system according to claim 11 wherein the power handling network of the system includes inductive reactive components and the system-state variables sensing means senses the inductive reactor currents and the output voltage of the system and supplies the sensed values to the comparison circuit means of the controller.

13. An improved power delivery system according to claim 11 wherein the power handling network of the system includes both inductive reactive components and capacitive reactive components and the system-state variables sensing means senses both the inductive reactor currents and the voltages across the capacitive reactive component and supplies the sensed values to the comparison circuit means of the controller.

14. An improved power delivery system according to claim 11 wherein the designer specified timing parameters can be proportioned such that the controller while operating the power system in a free running manner, under steady-state conditions switches the power switch of the system on and off at either a constant frequency, a frequency functionally related to the system operating conditions or parameters, with constant off-time or with constant on-time and under each of these different operating manners the system can be made to operate either in a continuous reactor mmf mode or a discontinuous reactor mmf mode depending upon the specified output operating characteristics and the system parameters.

15. An improved power delivery system according to claim 11 wherein the power handling network of the system includes capacitive reactive components and the system-state variables sensing means senses the capacitive reactive voltages and the output voltage of the system and supplies the sensed values to the comparison means of the controller.

16. An improved power delivery system according to claim 3 for use as a voltage step up DC to DC power converter wherein said fast state-plane switching boundary computation circuit means comprises analog computation circuit means for deriving a computed value of average output current $i_O^o$ for a desired value of average output voltage $V_O$ for the power delivery system and a computed load impedance value derived from the measured output voltage $V_O^*$ and measured output current $i_O^*$, analog computation circuit means for deriving the computed value $(V_O - v_I^*)$ from the desired value of output voltage $V_O$ and measured value of input voltage $v_I^*$, analog computation circuit means for deriving a portion of the equation for the switch-on dynamic state-plane switching boundary $V_{on}^o$ where:

$$v_{on}^o = \frac{Li_o}{Cv_I^o}(i_B^o - i_X^*) + i_X^* r_C, \qquad (1)$$

analog computation circuit means for deriving the switch-off dynamic state-plane switching boundary $v_{off}^o$ where:

$$v_{off}^o = \frac{L(i_B^2 - i_X^{*2})}{2C(V_O - v_I^*)} - \frac{Li_O^o(i_B - i_X^*)}{C(V_O - v_I^*)}, \qquad (2)$$

analog computation circuit means for deriving the computed value of a comparison voltage $v_X^o$ where:

$$v_X^o = v^o + \frac{i_O^o T}{2C} + v_O^* + r_c i_O^* - V_O, \qquad (3)$$

and where:

$V_O$ = desired average output voltage for the system at the new steady state operating condition in the state-plane $L$ = value of the inductive reactive component of the power handling network $i_O^o$ = computed value of the average output current which is commensurate with the desired average output voltage $V_O$ $C$ = capacitance value of the capacitive reactive components employed in the power handling network $v_I^*$ = measured value of the input voltage to the system $i_B^o$ = the computed current coordinate of the steady state switch-off point $i_X^*$ = the measured value of the reactor current $r_C$ = the equivalent series resistance value of the capacitive reactor component in the power handling network $T$ = designer specified steady-state operation period $v^o$ = computed voltage comprising a portion of the coordinate of the steady state switch-off point in the system state-plane $v_O^*$ = the measured value of the output voltage of the system 17. An improved power delivery system according to claim 16 wherein said fast responding analog computation circuit means further includes computation circuit means for deriving different values for $v^o$ and $i_B^o$ dependent upon whether the power converter is operating in the continuous reactor mmf mode or the discontinuous reactor mmf mode and including dual analog multiplexer means responsive to the value of the computed steady state switch-on current $i_A^o$ where $i_A^o > 0$ indicates continuous mmf mode and $i_A \leqq 0$ indicates discontinuous mmf mode and wherein for the continuous mmf mode of operation:

$$v^o = - \frac{i_o^o v_f^{*2} T}{2CV_O} \text{ and} \tag{4}$$

$$i_B^o = \frac{i_o^o V_O}{v_f^*} + v_f^* \frac{(V_O - v_f^*)T}{2LV_O} \tag{5}$$

and for the discontinuous conduction mode of operation $$v^o = - \frac{i_o^o}{3C} \sqrt{\frac{2i_o^o LT}{(V_O - v_f^*)}} \text{ and} \tag{6}$$

$$i_B^o = \sqrt{\frac{2T(V_O - v_f^*)i_o^o}{L}} \ . \tag{7}$$

18. An improved power delivery system according to claim 17 wherein the power handling network of the system includes inductive reactive components and the system-state variables sensing means senses the inductive reactor currents and the output voltage of the system and supplies the sensed values to the comparison circuit means of the controller.

19. An improved power delivery system according to claim 17 wherein the power handling network of the system includes both inductive reactive components and capacitive reactive components and the system-state variables sensing means senses both the inductive reactor currents and the voltage across the capacitive reactive components and supplies the sensed values to the comparison circuit means of the controller.

20. An improved power delivery system according to claim 17 wherein designer specified timing parameters can be proportioned such that the controller operating the power system in a free running manner, at constant frequency, at a frequency functionally related to the system operating conditions or parameters, with constant off-time or with constant on-time and within each of these different operating manners the system can be made to operate either in a continuous reactor mmf mode or a discontinuous reactor mmf mode depending upon the specified output operating characteristics and the system parameter.

21. An improved power delivery system according to claim 17 wherein the power handling network of the system includes capacitive reactive components and the system-state variables sensing means senses the capacitive reactive voltages and the output voltage of the system and supplies the sensed values to the comparison means of the controller.

22. An improved power delivery system according to claim 3 wherein the power delivery system comprises a current step-up DC to DC converter whose dynamic state-plane switching boundary defining the switch-off states of the system is given by the expression:

$$v^o_{O-off} = c_1^o(i_X^{*2} - i_B^{o2}) + c_2^o(i_X^* - i_B^o) + v_B^o + (i_X^* - i_O^*)r_C \tag{1}$$

the dynamic state-plane switching boundary value line of the system defining the switch-on states is given by:

$$v^o_{O-on} = c_3^o(i_X^{*2} - i_B^{o2}) + v_B^o + (i_X^* - i_O^*)r_C + c_4^o(i_X^* - i_B^o) \tag{2}$$

where $$c_1^o = - \frac{L}{2CV_O} \tag{3}$$

$$c_2^o = \frac{i_o L}{CV_O} \tag{4}$$

$$c_3^o = - \frac{L}{2C(V_O - v_f^*)} \tag{5}$$

$$c_4^o = \frac{i_o^o L}{C(V_O - v_f^*)} \tag{6}$$

and $i_X^*$ is the measured value of the power network reactor current, $i_B^o$ is the computed value of the reactor current at the desired new steady-state switch-off point, $v_B^o$ is the computed value of the capacitor voltage at the desired new steady-state switch-off point, $i_O^*$ is the measured value of the output current, $r_C$ is the value of the equivalent series resistance of the capacitive reactive component in the power handling network, L is the value of inductance of the inductive reactive component in the power handling network, C is the value of capacitance of the capacitive reactive component of the power handling network, $V_O$ is the desired average output voltage for the system while operating under steady-state at newly imposed externally applied operating conditions, $i_O^o$ is the computed value of the average output current which is commensurate with the desired average output voltage at the new steady-state operating conditions and $v_f^*$ is the measured value of the input voltage to the power delivery system.

23. A novel controller for optimizing the on-off periods of operation of an on-off switching type power delivery system including in combination fast responding switching boundary computation circuit means supplied with the component values of selected power handling network components of a power delivery system with which the controller is used, a desired output operating characteristic for the system such as desired average output voltage and a designer specified timing parameter together with signals representative of the operating conditions externally imposed on a power delivery system with which the controller is used and signals representative of the actual instantaneous state variables representative of the state of selected power handling network components of the power delivery system, said fast responding switching boundary computation circuit means operating to derive dynamic state-plane switching boundary values defining a desired new area of steady-state operation and distinct new areas of on-off operation in the operating state-space for the power delivery system under different externally imposed operating conditions; and comparison circuit means responsive to the output from said switching boundary computation circuit means and to the signals representative of the values of the system-state variables for comparing the dynamic state-space switching boundary value to the system-state variables values and deriving respective on-off controlling output signals for controlling the on-off state of the power delivery system in response to the location of the state of the system variables in the system-state-space relative to the switching boundary values.

24. A novel controller for an on-off switching type of power delivery system according to claim 23 wherein the system state-space for the on-off power delivery system with which the controller is used is characterized by families of different switch-on (on-time) and switch-off (off-time) trajectories in the system state-space for a given power delivery system and set of externally imposed operating conditions and with respect to which there is a unique set of dynamic boundary values identified by the system parameters and desired average output voltage, said novel controller during each on-off switching cycle causing the power delivery system to remain in a selected on-off condition in response to the on-off controlling output signal from the comparison circuit means while th power delivery system state traverses along a selected on-time/off-time trajectory dependent upon the initial operating state of the system state variables and the projected position of the desired new steady-state operating area in the system-state space until intercepting the dynamic state-space switching boundary peculiar to the new externally imposed operating conditions and to switch over to the opposite on-off condition and to remain in the switched over condition while the system-state traverses along the uniquely selected companion on-time/off-time trajectory identified by the interception of the first mentioned trajectory with the dynamic switching boundary until reaching a desired new steady state operating condition whereby the power delivery system can be transiently changed from an initial operating steady-state condition to a different operating steady-state condition in response to the new externally imposed operating conditions in a precise, single-cycle on-off switching sequence.

25. A novel controller according to claim 24 wherein said fast boundary computation circuit means comprises digital computation circuit means for deriving a computed value of average output current $i_o^o$ from the desired average output voltage value $V_O$ and a computed load value derived from the measured output voltage and measured output current, means for computing a plurality of coefficients from the computed value of average output current, the desired average output voltage and the system parameters, means employing the computed plurality of coefficients to compute the dynamic on-time and off-time switching boundary values $v^o{}_{O-on}$ and $v^o{}_{O-off}$ respectively, means for deriving a computed desired value of steady-state switch-on current $i_A{}^o$ upon the power delivery system obtaining steady-state operation, and wherein the comparison circuit means comprises means for comparing the measured value of the output voltage $v_O{}^*$ to the computed value of the switch-on dynamic switching boundary line $v_{O-on}{}^o$ at the measured value of the reactor current $i_X{}^*$, means for comparing the computed value of the dynamic switching boundary swith-off line $v^o{}_{O-off}$ to the measured value of the output voltage $v_O{}^*$, means for comparing the measured value of the reactor current $i_X{}^*$ to the computed value of the steady-state switch-on current $i_A{}^o$ and deriving controlling on-off switching signals for controlling operation of the power delivery system in accordance with the result of the comparative values.

26. A novel controller according to claim 25 for use with a power delivery system whose dynamic state-plane switching boundary defining the off-time state of the system is given by the expression:

$$v^o{}_{O-off} = c_1{}^o(i_X{}^{*2} - i_B{}^{o2}) + c_2{}^o(i_X{}^* - i_B{}^o) + v_B{}^o - i_o{}^* r_C \quad (1)$$

the dynamic state-plane switching boundary value line of the system defining the switch-on state is given by:

$$v^o{}_{O-on} = c_3{}^o(i_X{}^* - i_B{}^o) + v_B{}^o + (i_X{}^* - i_o{}^*) r_C \quad (2)$$

where $$c_1^o = -\frac{L}{2C(V_O - v_I^*)} \quad (3)$$

$$c_2^o = \frac{i_O^o L}{C(V_O - v_I^*)} \quad (4)$$

$$c_3^o = -\frac{i_O^o L}{v_I^* C} \quad (5)$$

and $i_X{}^*$ is the measured value of the power network reactor current, $i_B{}^o$ is the computed value of the reactor current at the desired new steady-state switch-off point, $v_B{}^o$ is the computed value of the capacitor voltage at the desired new steady-state switch-off point, $i_o{}^*$ is the measured value of the output current, $r_C$ is the value of the equivalent series resistance of the capacitive reactive component in the power handling network, L is the value of inductance of the inductive reactive component in the power handling network, C is the value of capacitance of the capacitive reactive component of the power handling network, $V_O$ is the desired average output voltage for the system while operating under steady-state at newly imposed externally applied operating conditions, $i_O{}^o$ is the computed value of the average output current which is commensurate with the desired average output voltage at the new steady-state operating conditions and $v_I{}^*$ is the measured value of the input voltage to the power delivery system.

27. A novel controller according to claim 25 for use with a voltage step-up DC to DC power converter power delivery system wherein said fast state-plane switching boundary computation circuit means comprises analog computation circuit means for deriving a computed value of average output current $i_O{}^o$ for a desired value of average output voltage $V_O$ for the power delivery system and a computed load impedance value derived from the measured output voltage $v_O{}^*$ and measured output current $i_O{}^*$, analog computation circuit means for deriving the computed value $(V_O - v_I{}^*)$ from the desired value of output voltage $V_O$ and measured value of input voltage $v_I{}^*$, analog computation circuit means for deriving the switch-on dynamic state-plane switching boundary $v_{on}{}^o$ where:

$$v_{on}^o = \frac{Li_O^o}{Cv_I^*}(i_B^o - i_X^*) + i_X^* r_C, \quad (1)$$

analog computation circuit means for deriving a portion of the equation for the switch-off dynamic state-plane switching boundary $v_{off}{}^o$ where:

$$v_{off}^o = \frac{L(i_B^{o2} - i_X^{*2})}{2C(V_O - v_I^*)} - \frac{Li_O^o(i_B^o - i_X^*)}{C(V_O - v_I^*)}, \quad (2)$$

analog computation circuit means for deriving the computed value of a comparison voltage $v_X^o$ where:

$$v_X^o = v^o + \frac{i_O^o T}{2C} + v_O^* + r_c i_O^* - V_O, \quad (3)$$

and where:

- $V_O$ = desired average output voltage for the system at the new steady state operating condition in the state-plane
- $L$ = value of the inductive reactive component of the power handling network
- $i_O^o$ = computed value of the average output current which is commensurate with the desired average output voltage $V_O$
- $C$ = capacitance value of the capacitive reactive components employed in the power handling network
- $v_I^*$ = measured value of the input voltage to the system
- $i_B^o$ = the computed current coordinate of the steady state switch-off point
- $i_X^*$ = the measured value of the reactor current
- $r_C$ = the equivalent series resistance value of the capactitive reactor component in the power handling network
- $T$ = designer specified steady-state operation period
- $v^o$ = computed voltage comprising a portion of the coordinate of the steady state switch-off point in the system state-plane
- $v_O^*$ = the measured value of the output voltage of the system 28. A novel controller according to claim 27 wherein said fast responding analog computation circuit means further includes computation circuit means for deriving different values for $v^o$ and $i_B^o$ dependent upon whether the power converter is operating in the continuous conduction mode or the discontinuous conduction mode and including dual analog multiplexer means responsive to the value of the computed steady state switch-on current $i_A^o$ where $i_A^o > 0$ indicates continuous conduction mode and $i_A \leq 0$ indicates dicontinuous conduction mode and wherein for the continuous conduction mode of operation:

$$v^o = - \frac{i_O^o v_I^* T}{2CV_O} \text{ and} \quad (4)$$

$$i_B^o = \frac{i_O^o V_O}{v_I^*} + v_I^* \frac{(V_O - v_I^*)T}{2LV_O} \quad (5)$$

and for the discontinuous conduction mode of operation $$v^o = - \frac{i_O^o}{3C} \sqrt{\frac{2i_O^o LT}{(V_O - v_I^*)}} \text{ and} \quad (6)$$

$$i_B^o = \sqrt{\frac{2T(V_O - v_I^*)i_O^o}{L}}. \quad (7)$$

29. A new method of controlling on-off switching type of power delivery systems for transferring electrical power from an input source of electrical energy to a load in a controlled manner and optimizing the on-off period of operation of said on-off switching type power delivery system to thereby provide extremely fast transient response to changed operating conditions imposed on the system, precise regulation and highly stable operation; said method comprising:

- sensing the operating conditions externally imposed on the power delivery system;
- sensing the actual state of selected power handling network components comprising the power delivery system;
- computing dynamic on-off switching state-space boundary values defining a desired new area of steady-state operation and distinct new areas of on-off operation in the operating state-space for the power delivery system under the different new externally imposed operation conditions, the component values of the selected power handling network components, a desired output operating characteristic for the system and a designer specified timing parameter; and
- comparing the values of the system state variables to the dynamic state-plane switching boundary values and deriving respective on-off controlling output signals for controlling the on-off state of the power delivery system in response to the location of the state of the system variables in the system state-space relative to the switching boundary values.

30. A new control method according to claim 29 wherein the system state space for the on-off power delivery system is characterized by families of distinct different switch-on (on-time) and switch-off (off-time) trajectories in the system-state space for a given power delivery system and set of imposed operating conditions and with respect to which there is a unique set of dynamic on-off switching boundary values identified by the system parameters and desired output characteristics, and wherein during each on-off switching cycle the power delivery system is caused to remain in a selected on-off condition in response to the on-off controlling output signal from said comparison circuit means while the power delivery system state traverses along a selected on-time/off-time trajectory dependent upon the initial operating state of the system-state variables until intercepting the dynamic state-plane boundary characteristic of the instantaneous imposed operating conditions and to switch over to the opposite on-off condition and to remain in the switched over condition while the sytem-state traverses along the uniquely selected companion on-time/off-time trajectory identified by the interception of the first mentioned trajectory with the dynamic state-plane switching boundary until reaching a desired new steady state operating condition whereby the system can be transiently changed from an initial operating steady-state condition to a different operating steady-state condition in response to new externally imposed operating conditions in a precise, single on-off switching cycle of control.

31. A new control method according to claim 30 wherein the shapes of the system-state space on-off trajectories for the power delivery system are known functions of the selected power handling network component values such as the system inductance and capacitance and of the externally imposed operating conditions such as the input voltage and output current whereby a change in any one of these parameters causes the shapes of the on-off trajectories to change dynamically along with the change in the dynamic state-plane on-off switching boundary values resulting from the change in any of these parameters.

* * * * *